(12) United States Patent
Repasi et al.

(10) Patent No.: US 7,941,852 B2
(45) Date of Patent: May 10, 2011

(54) DETECTING AN AUDIO/VISUAL THREAT

(75) Inventors: Rolf Repasi, Sunrise Beach (AU);
Simon Clausen, New South Wales (AU)

(73) Assignee: Symantec Corporation, Mountain View, CA (US)

( * ) Notice: Subject to any disclaimer, the term of this patent is extended or adjusted under 35 U.S.C. 154(b) by 872 days.

(21) Appl. No.: 11/866,753

(22) Filed: Oct. 3, 2007

(65) Prior Publication Data

US 2008/0086775 A1   Apr. 10, 2008

Related U.S. Application Data

(60) Provisional application No. 60/849,365, filed on Oct. 4, 2006.

(51) Int. Cl.
*G06F 11/00* (2006.01)
*G06F 12/14* (2006.01)

(52) U.S. Cl. .......................................... 726/22; 726/24

(58) Field of Classification Search .................. 726/22, 726/24

See application file for complete search history.

(56) References Cited

U.S. PATENT DOCUMENTS

| 6,973,577 | B1 * | 12/2005 | Kouznetsov | 726/25 |
| 7,765,410 | B2 * | 7/2010 | Costea et al. | 713/188 |
| 2003/0023854 | A1 * | 1/2003 | Novak et al. | 713/182 |
| 2003/0110385 | A1 * | 6/2003 | Golobrodsky et al. | 713/188 |
| 2003/0167153 | A1 * | 9/2003 | Alexander | 702/189 |
| 2004/0083389 | A1 * | 4/2004 | Yoshida | 713/201 |
| 2005/0154900 | A1 * | 7/2005 | Muttik | 713/188 |
| 2006/0031940 | A1 * | 2/2006 | Rozman et al. | 726/27 |
| 2006/0117384 | A1 * | 6/2006 | Larson et al. | 726/22 |
| 2007/0128899 | A1 * | 6/2007 | Mayer | 439/152 |
| 2007/0186282 | A1 * | 8/2007 | Jenkins | 726/22 |
| 2007/0222589 | A1 * | 9/2007 | Gorman et al. | 340/539.26 |

* cited by examiner

*Primary Examiner* — Michael Pyzocha
(74) *Attorney, Agent, or Firm* — Holland & Hart LLP

(57) ABSTRACT

A method, system, computer program product and/or computer readable medium of instructions for detecting if a processing system has been compromised with audio/visual threat. The method comprises steps of intercepting one or more requests to perform an activity associated with an audio and/or visual communication device of the processing system; and performing a behavioural analysis of the processing system to determine if the processing system exhibits behavioural characteristics indicative of the processing system having been compromised with an audio/visual threat.

20 Claims, 11 Drawing Sheets

DETECTING AN AUDIO/VISUAL THREAT

This application claims the benefit of priority from U.S. Provisional Patent Application No. 60/849,365 filed Oct. 4, 2006, and is incorporated by referenced.

TECHNICAL FIELD

The present invention generally relates to a method, system, computer readable medium of instructions and/or computer program product for detecting and optionally restricting a threat which transmits audio and/or visual data indicative of user activity at a processing system.

COPYRIGHT

A portion of the disclosure of this patent document contains material that is subject to copyright protection. The copyright owner has no objection to the facsimile reproduction by anyone of the patent disclosure, as it appears in a Patent Office patent files or records, but otherwise reserves all copyrights whatsoever.

BACKGROUND ART

As used herein a "threat" comprises malicious software, also known as "malware" or "pestware", which comprises software that is included or inserted in a part of a processing system for a harmful purpose. The term threat should be read to comprise possible, potential and actual threats. Types of malware can comprise, but are not limited to, malicious libraries, viruses, worms, Trojans, adware, malicious active content and denial of service attacks. In the case of invasion of privacy for the purposes of fraud or theft of identity, malicious software that passively observes the use of a computer is known as "spyware".

A hook (also known as a hook procedure or hook function), as used herein, generally refers to a callback function provided by a software application that receives certain data before the normal or intended recipient of the data. A hook function can thus examine or modify certain data before passing on the data. Therefore, a hook function allows a software application to examine data before the data is passed to the intended recipient.

An API ("Application Programming Interface") hook (also known as an API interception), as used herein as a type of hook, refers to a callback function provided by an application that replaces functionality provided by an operating system's API. An API generally refers to an interface that is defined in terms of a set of functions and procedures, and enables a program to gain access to facilities within an application. An API hook can be inserted between an API call and an API procedure to examine or modify function parameters before passing parameters on to an actual or intended function. An API hook may also choose not to pass on certain types of requests to an actual or intended function.

A process, as used herein, is at least one of a running software program or other computing operation, or a part of a running software program or other computing operation, that performs a task.

A hook chain as used herein, is a list of pointers to special, application-defined callback functions called hook procedures. When a message occurs that is associated with a particular type of hook, the operating system passes the message to each hook procedure referenced in the hook chain, one after the other. The action of a hook procedure can depend on the type of hook involved. For example, the hook procedures for some types of hooks can only monitor messages, others can modify messages or stop their progress through the chain, restricting them from reaching the next hook procedure or a destination window.

In a networked information or data communications system, a user has access to one or more terminals which are capable of requesting and/or receiving information or data from local or remote information sources. In such a communications system, a terminal may be a type of processing system, computer or computerised device, personal computer (PC), mobile, cellular or satellite telephone, mobile data terminal, portable computer, Personal Digital Assistant (PDA), pager, thin client, or any other similar type of digital electronic device. The capability of such a terminal to request and/or receive information or data can be provided by software, hardware and/or firmware. A terminal may comprise or be associated with other devices, for example a local data storage device such as a hard disk drive or solid state drive.

An information source can comprise a server, or any type of terminal, that may be associated with one or more storage devices that are able to store information or data, for example in one or more databases residing on a storage device. The exchange of information (ie. the request and/or receipt of information or data) between a terminal and an information source, or other terminal(s), is facilitated by a communication means. The communication means can be realised by physical cables, for example a metallic cable such as a telephone line, semi-conducting cables, electromagnetic signals, for example radio-frequency signals or infra-red signals, optical fibre cables, satellite links or any other such medium or combination thereof connected to a network infrastructure.

A system registry is a database used by operating systems, for example Windows™ platforms. The system registry comprises information needed to configure the operating system. The operating system refers to the registry for information ranging from user profiles, to which applications are installed on the machine, to what hardware is installed and which ports are registered.

An entity can comprise, but is not limited to, a file, an object, a class, a collection of grouped data, a library, a variable, a process, and/or a device.

Local communication devices such as video cameras (also commonly referred to as "webcams") and microphones are becoming more commonplace in modern processing systems. For example, current laptop computers are provided with in-built webcams and microphones.

Due to such devices becoming more popular, threats, such as malware, have recently been configured to utilise local communication devices for exploitation. Herein, this form of threat is referred to as an "audio/visual threat".

In some instances audio/visual threats have been configured to spy on an unsuspecting user of a compromised processing system using a webcam or microphone. The visual and/or audio data recorded by a webcam can be transferred to a third party, wherein the third party may use the visual and/or audio data for exploitation, such as determining when a user has left their premises so that a robbery can be performed. In some instances the audio/visual data has simply been used for voyeuristic activities.

In other instances, if the user has unsuspectingly left private information, such as details of their credit card, within visual range of the webcam, the visual data captured by the threat can be analysed by a third party to determine the details of the credit card for financial exploitation.

In other instances, the webcam can be controlled by the threat to record typing performed by the user on the keyboard of the processing system, in order to determine secret information such as usernames and passwords.

Recently, proof of concept computer programs have been developed which can utilise the sound of a user typing on the keyboard recorded by a microphone to determine keystrokes performed by the user within an acceptable accuracy. Again, secret information such as usernames and passwords can be determined using the audio data obtained by appropriately configured threat controlling the microphone of the compromised processing system.

Current approaches to detect audio/visual threats have involved using signature based detection software. Such software comprises a database of signatures, wherein each signature generally represents a file size of the malware, a file name associated with the malware, a cryptographic hash or checksum value of the malware, and pseudocode which represents program flow of the threat.

However, signature based approaches are becoming unsuitable as it can take a number of days for a vendor of such software to develop an appropriate signature which can detect and restrict the audio/visual threat. During the period of time when audio/visual theat is compromising a user's processing system, and the time when an appropriate signature is released by the vendor, the audio/visual threat can exploit audio/visual data obtained from the compromised processing system. Furthermore, unless a user continually updates signatures for their malware detection software, this compromised time period can also be unsatisfactorily extended.

Other approaches to deal with audio/visual threats have been to unplug microphones and webcams from the processing system. In some instances, placing an object such as a container over the webcam or microphone has also been suggested in order to overcome the compromised time period prior to a signature being released. Not only is this unsightly, but it can sometimes be extremely difficult and inconvenient for users of processing systems where the webcam and/or the microphone is in-built, such as a laptop computer.

Therefore, there exists a need for a method, system, computer readable medium of instructions, and/or a computer program product which can detect an audio/visual threat which has compromised a processing system and optionally restrict an audio/visual threat performing malicious activity in the processing system which overcomes or at least ameliorates at least one of the above mentioned disadvantages.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

DISCLOSURE OF INVENTION

In one broad form there is provided a method of detecting if a processing system has been compromised with audio/visual threat, wherein the method comprises:
intercepting one or more requests to perform an activity associated with an audio and/or visual communication device of the processing system; and
performing a behavioural analysis of the processing system to determine if the processing system exhibits behavioural characteristics indicative of the processing system having been compromised with an audio/visual threat.

In one form, the method comprises:
determining, using the request to perform the activity, an entity associated with the activity; and
performing the behavioural analysis in relation to the entity.

In another form, performing the behavioural analysis comprises applying one or more behavioural rules.

In one embodiment, the one or more behavioural rules comprises at least one of:
determining if the entity indicative of at least one of audio signal and visual signals being obtained by the audio and/or visual communication device;
determining if the entity is being interacted via a graphical user interface currently displayed on the desktop of the processing system;
determining if the entity is recording data indicative of at least one of audio data and visual data;
determining if the entity was launched by the user;
determining if the entity is attempting to connect to a remote network; and
determining if the entity is requesting the activity to be performed at regular intervals.

In another embodiment, a requesting entity requests the activity to be performed in relation to a target entity, wherein the method comprises:
determining, using a filter module, if the activity is suspicious or non-suspicious; and
in response to determining that the activity is suspicious, analysing, using an analysis module, at least one of the activity, the requesting entity and the target entity.

In one aspect, the filter module filters the activity according to the requesting entity and the target entity to determine if the activity is suspicious or non-suspicious.

In another aspect, the analysis module comprises a list of activity sequences indicative of an audio/visual threat, wherein analysing the suspicious activity comprises comparing the suspicious activity and at least one of activities which occurred prior to the suspicious activity and activities which occurred after the suspicious activity to the list of activity sequences, wherein in response to a positive comparison, the activity is determined to be associated with an audio/visual threat.

In one form, performing the behavioural analysis comprises:
determining an entity associated with the intercepted activity;
determining an entity threat value for the entity, the entity threat value being indicative of a level of threat that the entity represents to the processing system, wherein the entity threat value is determined based on one or more characteristics of the entity; and
comparing the entity threat value to an entity threat threshold to identify if the entity is malicious.

In another form, each of the one or more characteristics of the entity is associated with a respective characteristic threat value, wherein the method comprises calculating the entity threat value using at least some of the characteristic threat values for the one or more characteristics of the entity.

In one embodiment, at least one of the one or more characteristics of the entity is associated with a characteristic threat value formula, wherein the method comprises calculating, using the characteristic threat value formula, the characteristic threat value.

In another embodiment, at least one characteristic threat value is temporally dependent, wherein the method comprises calculating the at least one characteristic threat value for the entity using the characteristic threat value formula and a temporal value.

In one aspect, the at least one characteristic is a behaviour associated with the entity, wherein the method comprises calculating the at least one characteristic threat value for the entity using the characteristic threat value formula and a frequency of instances the behaviour has been performed.

In another aspect, the one or more characteristics comprises at least one of one or more legitimate characteristics indicative of non-malicious activity and one or more illegitimate characteristics indicative of malicious activity, wherein the method comprises determining the entity threat value using characteristic threat values associated with the one or more legitimate characteristics and the one or more illegitimate characteristics of the entity.

Optionally, the step of determining the entity threat value for an entity comprises calculating a difference between the characteristic threat values for the one or more legitimate characteristics of the entity, and the characteristic threat values for the one or more illegitimate characteristics of the entity, wherein the difference is indicative of the entity threat value.

In an optional form, the method comprises:
determining one or more related entities to the activity, wherein each related entity has an associated entity threat value; and
calculating the entity threat value for the activity using the entity threat value for at least some of the one or more related entities.

In another optional form, the method comprises:
determining one or more related entities to the activity, wherein each related entity has an associated entity threat value; and
calculating a group threat value for the activity and one or more related entities using the entity threat value for at least some of the one or more related entities and the activity.

Optionally, the method comprises weighting the entity threat value for at least one related entity according to a relatedness of the at least one related entity relative to the activity.

In another broad form there is provided a system to detect if a processing system has been compromised with audio/visual threat, wherein the system is configured to:
intercept one or more requests in the processing system to perform an activity associated with an audio and/or visual communication device of the processing system; and
perform a behavioural analysis of the processing system to determine if the processing system exhibits behavioural characteristics indicative of the processing system having been compromised with an audio/visual threat.

In one form, the system is configured to:
determine, using the request to perform the activity, an entity associated with the activity; and
perform the behavioural analysis in relation to the entity.

In another form, the system is configured to apply one or more behavioural rules to perform the behavioural analysis.

In one embodiment, application of the one or more behavioural rules determines at least one of:
if the entity is indicative of at least one of audio signal and visual signals being obtained by the audio and/or visual communication device;
if the entity is being interacted via a graphical user interface currently displayed on the desktop of the processing system;
if the entity is recording data indicative of at least one of audio data and visual data;
if the entity was launched by the user;
if the entity is attempting to connect to a remote network; and
if the entity is requesting the activity to be performed at regular intervals;

wherein results of the application of the one or more behavioural rules is used to determine whether the processing system having been compromised with an audio/visual threat.

In another embodiment, a requesting entity requests the activity to be performed in relation to a target entity, wherein the system is configured to:
determine, using a filter module, if the activity is suspicious or non-suspicious; and
analyse, using an analysis module, at least one of the activity, the requesting entity and the target entity in response to determining that the activity is suspicious.

In one aspect, the filter module filters the activity according to the requesting entity and the target entity to determine if the activity is suspicious or non-suspicious.

In another aspect, the analysis module comprises a list of activity sequences indicative of an audio/visual threat, wherein the system is configured to analyse the suspicious activity by comparing the suspicious activity and at least one of activities which occurred prior to the suspicious activity and activities which occurred after the suspicious activity to the list of activity sequences, wherein in response to a positive comparison, the activity is determined to be associated with an audio/visual threat.

In another form, the system is configured to:
determine an entity associated with the intercepted activity;
determine an entity threat value for the entity, the entity threat value being indicative of a level of threat that the entity represents to the processing system, wherein the entity threat value is determined based on one or more characteristics of the entity; and
compare the entity threat value to an entity threat threshold to identify if the entity is malicious.

In another form, each of the one or more characteristics of the entity is associated with a respective characteristic threat value, wherein the system is configured to calculate the entity threat value using at least some of the characteristic threat values for the one or more characteristics of the entity.

In another broad form there is provided a computer program product comprising a computer readable medium having a computer program recorded therein or thereon, the computer program being configured to detect if a processing system has been compromised with audio/visual threat, wherein the computer program product configures the processing system to:
intercept one or more requests in the processing system to perform an activity associated with an audio and/or visual communication device of the processing system; and
perform a behavioural analysis of the processing system to determine if the processing system exhibits behavioural characteristics indicative of the processing system having been compromised with an audio/visual threat.

BRIEF DESCRIPTION OF FIGURES

An example embodiment of the present invention should become apparent from the following description, which is given by way of example only, of a preferred but non-limiting embodiment, described in connection with the accompanying figures.

MODES FOR CARRYING OUT THE INVENTION

Figure 1A:
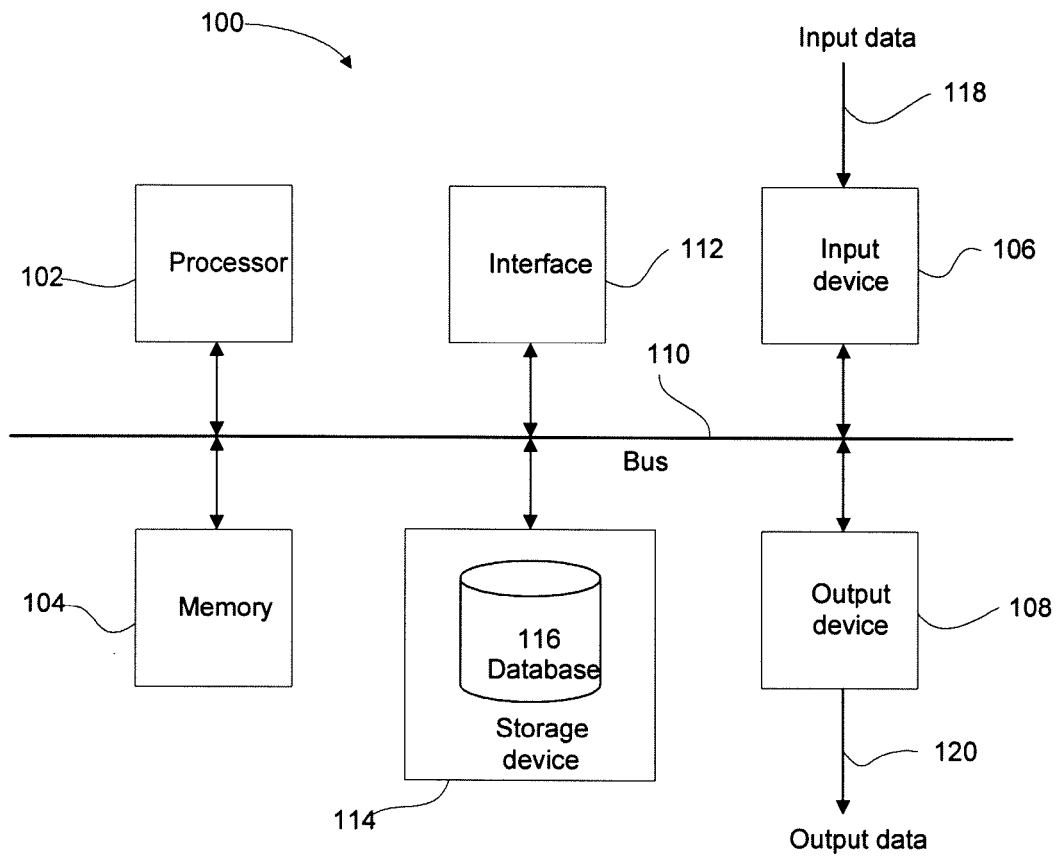
FIG. 1A is a block diagram illustrating an example of a processing system.

The following modes, given by way of example only, are described in order to provide a more precise understanding of the subject matter of a preferred embodiment or embodiments.

In the figures, incorporated to illustrate features of an example embodiment, like reference numerals are used to identify like parts throughout the figures.

A particular embodiment of the present invention can be realised using a processing system, an example of which is shown in FIG. 1A.

In particular, the processing system 100 generally comprises at least one processor 102, or processing unit or plurality of processors, memory 104, at least one input device 106 and at least one output device 108, coupled together via a bus or group of buses 110. The at least one input device can take the form of an audio/visual communication device such as a webcam or a microphone. In certain embodiments, input device 106 and output device 108 could be the same device. An interface 112 can also be provided for coupling the processing system 100 to one or more peripheral devices, for example interface 112 could be a PCI card or PC card. At least one storage device 114 which houses at least one database 116 can also be provided. The memory 104 can be any form of memory device, for example, volatile or non-volatile memory, solid state storage devices, magnetic devices, etc. The processor 102 could comprise more than one distinct processing device, for example to handle different functions within the processing system 100. Input device 106 receives input data 118 and can comprise, for example, a keyboard, a pointer device such as a pen-like device or a mouse, audio receiving device for voice controlled activation such as a microphone, data receiver or antenna such as a modem or wireless data adaptor, data acquisition card, etc. Input data 118 could come from different sources, for example keyboard instructions in conjunction with data received via a network. Output device 108 produces or generates output data 120 and can comprise, for example, a display device or monitor in which case output data 120 is visual, a printer in which case output data 120 is printed, a port for example a USB port, a peripheral component adaptor, a data transmitter or antenna such as a modem or wireless network adaptor, etc. Output data 120 could be distinct and derived from different output devices, for example a visual display on a monitor in conjunction with data transmitted to a network. A user could view data output, or an interpretation of the data output, on, for example, a monitor or using a printer. The storage device 114 can be any form of data or information storage means, for example, volatile or non-volatile memory, solid state storage devices, magnetic devices, etc.

In use, the processing system 100 can be adapted to allow data or information to be stored in and/or retrieved from, via wired or wireless communication means, the at least one database 116. The interface 112 may allow wired and/or wireless communication between the processing unit 102 and peripheral components that may serve a specialised purpose. The processor 102 receives instructions as input data 118 via input device 106 and can display processed results or other output to a user by utilising output device 108. More than one input device 106 and/or output device 108 can be provided. It should be appreciated that the processing system 100 may be any form of terminal, server processing system, specialised hardware, or the like.

Figure 1B:
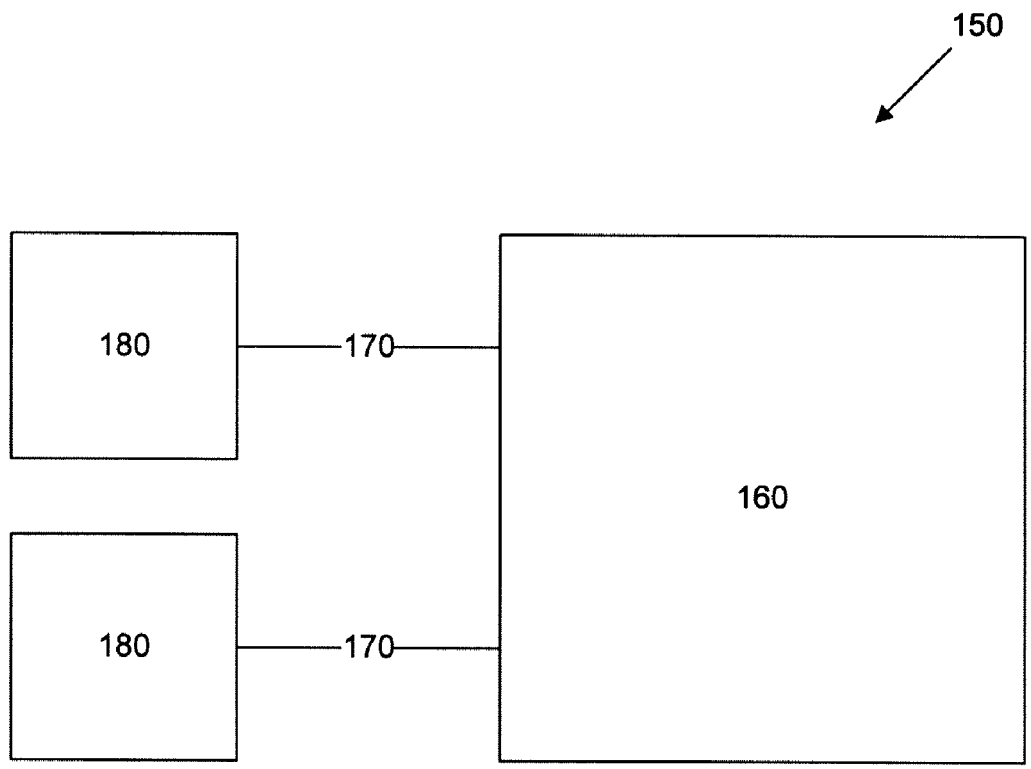
FIG. 1B is a block diagram illustrating an example of a distributed system.

Referring now to FIG. 1B, there is shown a distributed system 150 which can also be used to implement particular embodiments, wherein the distributed system 150 comprises one or more client processing systems 180 in data communication via a network 170 with one or more server processing systems 160. The one or more client processing systems 180 and the one or more server processing systems 160 are forms of processing system 100 illustrated in FIG. 1A. Input data 118 and output data 120 can be communicated to other devices via the network 170. The transfer of information and/or data over the network 170 can be achieved using wired communications means or wireless communications means. The server processing system 160 can facilitate the transfer of data between the network 170 and one or more databases. The server processing system 160 and one or more databases provide an example of an information source.

Figure 2:
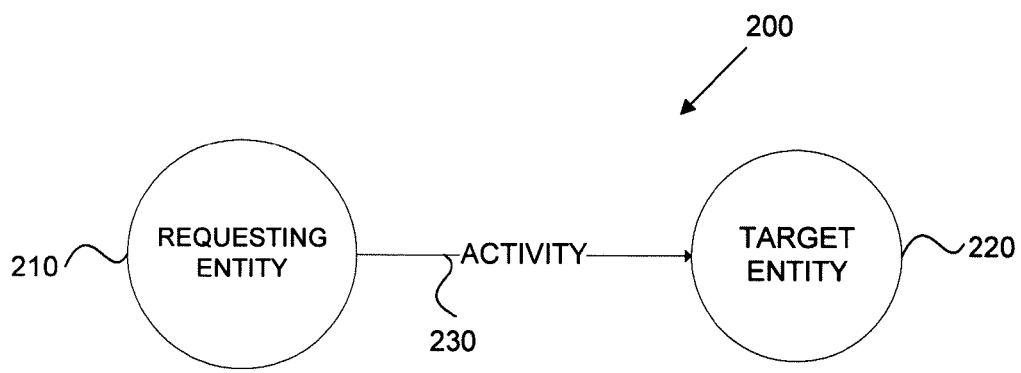
FIG. 2 is a block diagram illustrating an example request.

Referring to FIG. 2, there is shown a block diagram illustrating a request 200 to perform an activity 230. Generally, the request 200 is associated with an activity 230, a target entity 220 and a requesting entity 210. In particular, the requesting entity 210 causes the activity 230 to be performed in relation to the target entity 220.

For example, an executable object in a processing system 100 may request 200 to obtain access to an input stream of a communication device such as a microphone or a webcam. In this example, the executable object would be considered the requesting entity 210, the activity 230 would be considered the act of obtaining access to an input stream, and the target entity 220 would be input stream of the communication device. The requesting entity 210 is a starting point in the processing system, or network of processing systems, which requests 200 the activity 230 to be performed, and the target entity 220 is an end point in the processing system, or network of processing systems, which the action 230 is performed.

As will be described in more detail, a request 200 to perform an activity 230 can be analysed to determine at least one of the requesting entity 210 and the target entity 220. By determining at least one of the requesting entity 210 and the target entity 220, an accurate and efficient process of detecting a threat in a processing system 100 can be performed.

Figure 3:
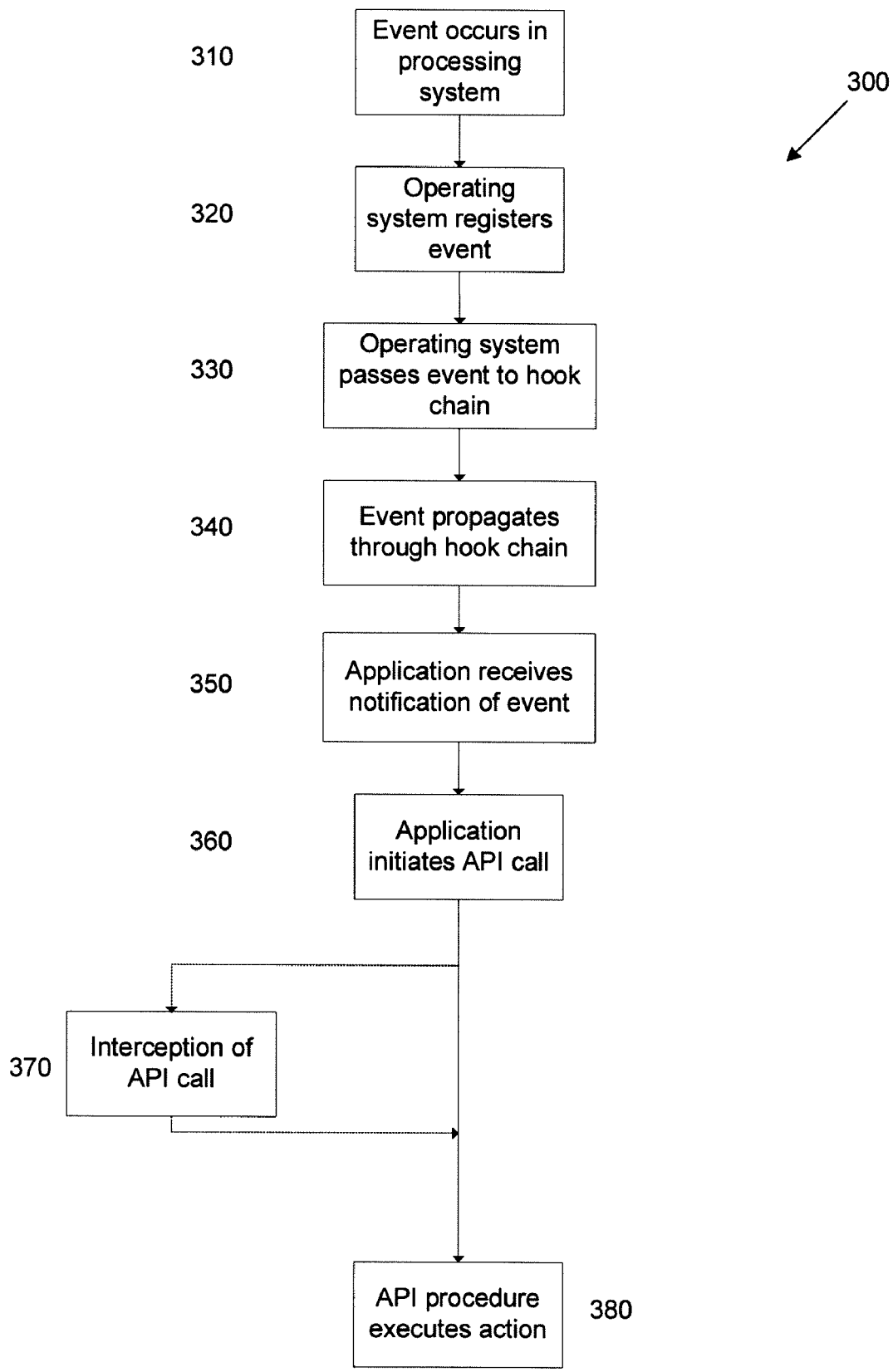
FIG. 3 is a flow diagram illustrating an example method of intercepting a request.

Referring to FIG. 3 there is shown an example of a method 300 of intercepting an activity in a processing system 100.

At step 310, an event occurs in the processing system 100. The event can be a request 200 by a requesting entity 210 to perform an action 230 in relation to a target entity 220. At step 320, an operating system running in the processing system 100 registers the occurrence of the event. At step 330, the operating system passes the registered event to the hook chain. At step 340, the event is passed to each hook in the hook chain such that different applications, processes, and devices may be notified of the registered event. Once the event has propagated throughout the hook chain, the method 300 comprises at step 350 an application receiving notification of the event being registered by the processing system 100.

At step 360, the method 300 comprises the application initiating an API call to an API procedure so as to carry out a response to the registered event, wherein the response may be the execution of the action 230 in relation to the target entity 220. If an API hook has been established between the API call and the API procedure, the API call is intercepted before it reaches the API procedure at step 370. Processing can be performed by an API hook function once the API call has been intercepted prior to the API procedure being called. The API call may be allowed to continue calling the API procedure at step 380 such that the action 230 is performed in relation to the target entity 220.

Figure 4A:
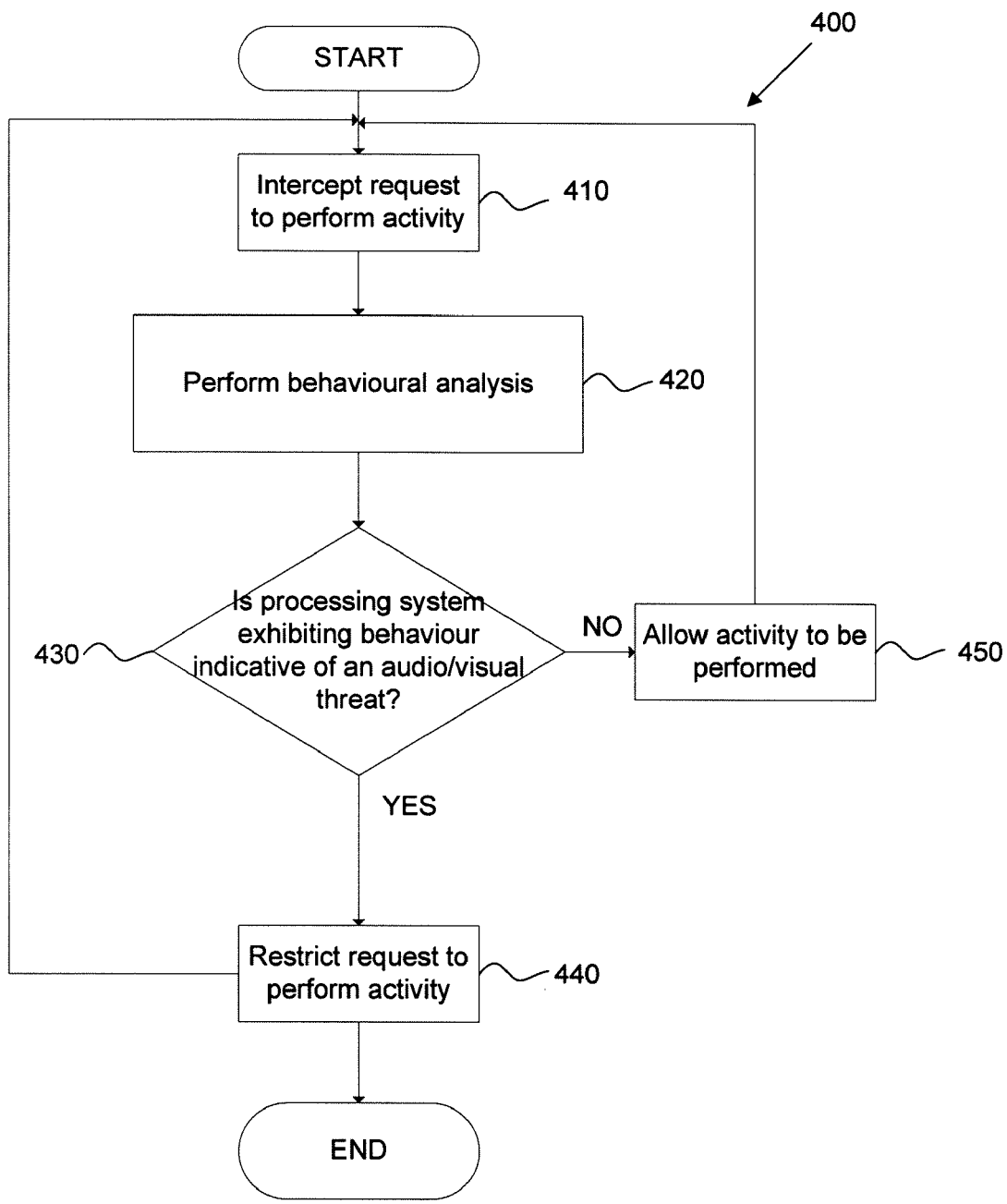
FIG. 4A is a flow diagram illustrating an example to detect an audio/visual threat.

Referring to FIG. 4A, there is shown an example method 400 of detecting an audio/video threat.

At step 410, the method 400 comprises intercepting one or more requests to perform an activity associated with an audio and/or visual communication device of the processing system.

At step 420, the method 400 comprises performing a behavioural analysis of the processing system to determine if the processing system exhibits behaviour indicative of the processing system having been compromised with an audio/visual threat.

The behavioural analysis allows for dynamic detection of an audio/visual threat. If a particular version of an audio/visual threat has been modified such that a threat signature for the version of the audio/visual threat does not detect the modified audio/visual threat, the behaviour exhibited by the compromised processing system can be detected during the behavioural analysis of the processing system to detect the modified audio/visual threat. A detailed explanation of detecting threatening and malicious activity based upon behavioural analysis is described in the Applicant's co-pending U.S. patent application Ser. No. 11/780,113 and co-pending Australian Patent application 2007203373 entitled "Detecting Malicious Activity", the content of which is herein incorporated by cross-reference.

At step 430, in the event that the request 200 is determined to be associated with the audio/visual threat, the method 400 comprises restricting the request 200 to perform the activity 230 in the processing system 100 at optional step 440. In the event that the request 200 is not associated with an audio/visual threat, the method 400 optionally proceeds to step 450 which comprises allowing the request 200 to perform the activity 230 in the processing system 100.

Figure 4B:
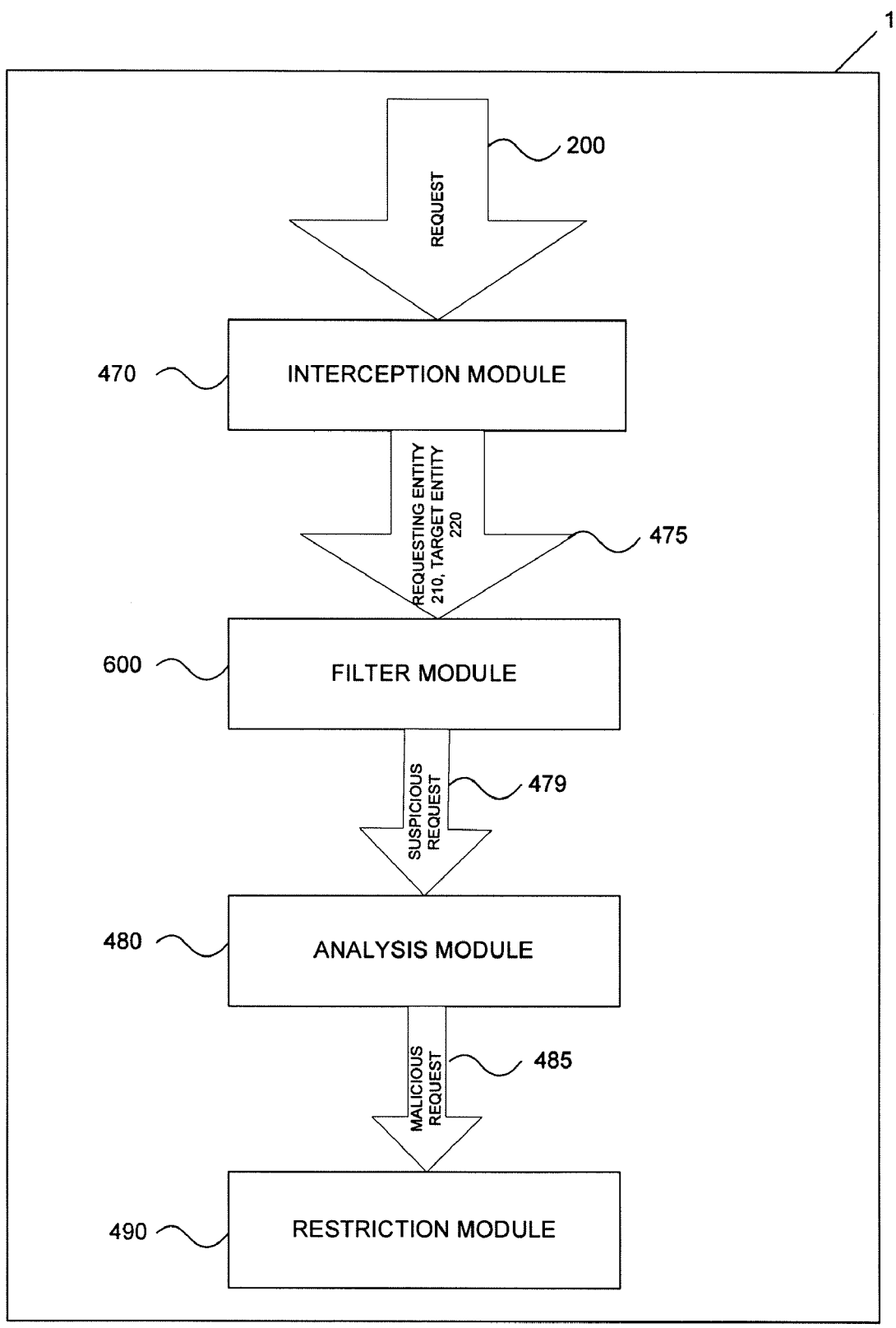
FIG. 4B is a block diagram illustrating an example system to detect an audio/visual threat.

Referring now to FIG. 4B, there is shown an example of a system 1 to detect an audio/visual threat which has compromised the processing system 100.

In particular the system 1 comprises an interception module 470 configured to intercept one or more requests to perform an activity 230 associated with an audio and/or visual communication device of the processing system.

The system 1 can optionally comprise a filter module 600 which filters intercepted requests to determine suspicious requests 475 requiring analysis.

The system 1 also comprises an analysis module 480 configured to execute a behavioural analysis of the processing system to determine if the processing system exhibits behaviour indicative of the processing system having been compromised with an audio/visual threat.

The analysis module 480 can also comprise a number of sub-modules, which can be used to determine if the request 200 is associated with an audio/visual threat, as will be explained in more detail later in this document. The analysis module 480 can be configured to control the number of sub-modules to determine if the request is associated with an audio/visual threat.

Optionally the system 1 can comprise a restriction module 490 which is configured to restrict the activity to be performed by the processing system 100 in the event that results of the behavioural analysis indicate that the request 200 is associated with an audio/visual threat. In an alternate form, the interception module 470 is configured to restrict the request 200 associated with an audio/visual threat, as will be explained in more detail later in this document.

Figure 5:
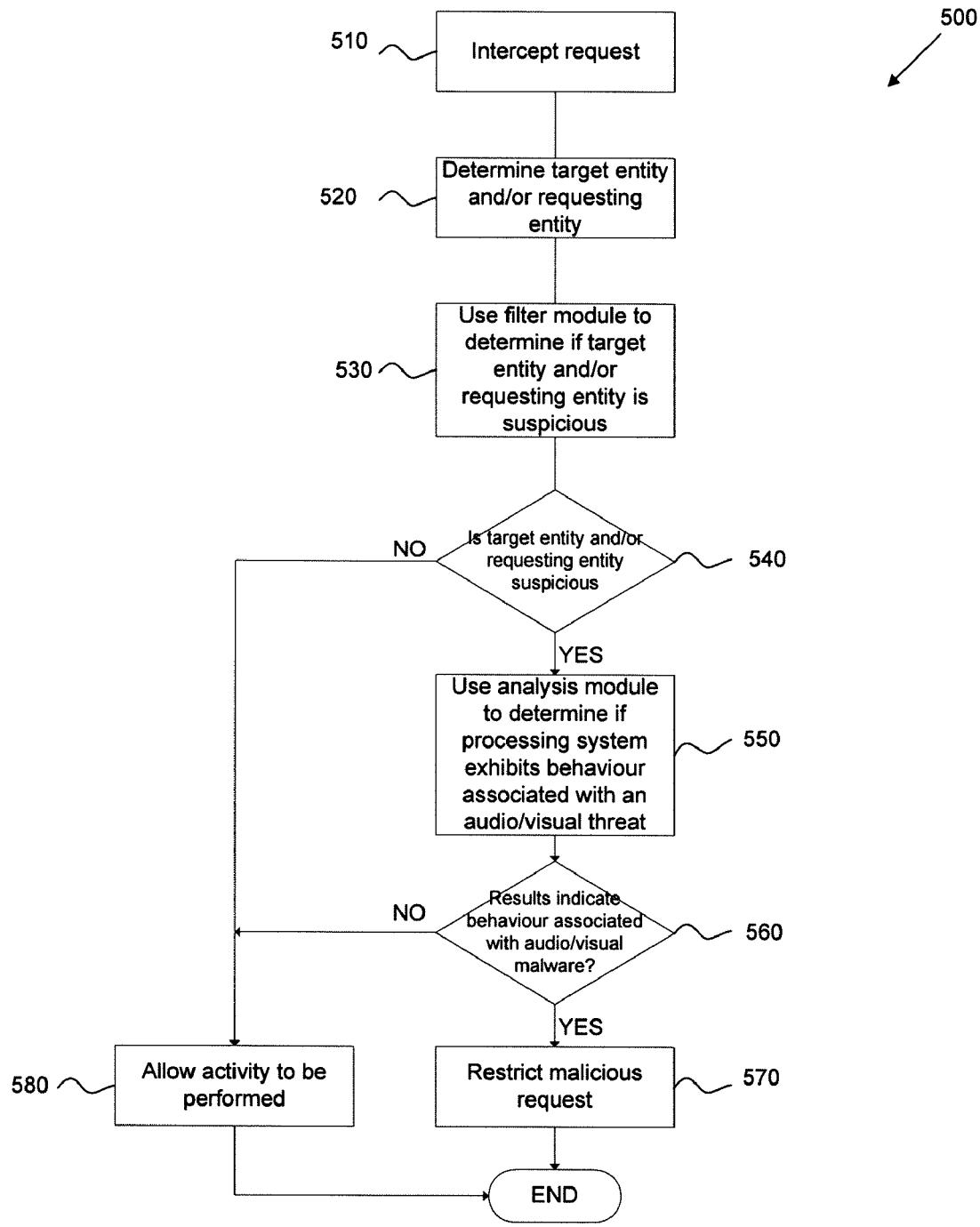
FIG. 5 is a more detailed flow diagram illustrating an example method of detecting an audio/visual threat.

Referring now to FIG. 5, there is shown a more detailed flow diagram of an example to detect an audio/visual threat.

In particular, at step 510, the method 500 comprises intercepting the request 200, which can be performed using the technique explained in relation to FIG. 3. The request 200 can be in the form of an API call, and the interception module 470 can be provided in the form of an API hook function.

Specific requests 200 can be intercepted which relate to one or more local communication devices, such as a webcam or a microphone. For example, requests 200 can be intercepted which attempt to obtain access to an input stream for one or more communication devices such as a web-cam or a sound card input/line in for a microphone.

At step 520, the method 500 comprises determining at least one of the requesting entity 210 and the target entity 220 of the request 200 to perform the activity 230. This can be performed by the interception module 470. The requesting entity 210 and the target entity 220 of the request 200 can be determined using one or more parameters which are passed to the hook function.

The interception module 470 can be configured to record intercepted requests in a intercepted request log file. The interception module can also record associated data such as at least one of the target entity, the requesting entity, properties associated with one of the target entity and the requesting entity, the time/date that the request was intercepted, processing usage, and memory usage. As will be explained in more detail later in this document, the intercepted request log file can be used to analyse a trend in behaviour in the processing system.

At steps 530 and 540, the method 500 can comprise using a filter module 600 to determine if the request 200 is suspicious. The filter module 600 is configured to apply one or more filter rules to minimise false positive analysis of requesting entities 210 and target entities 220 which are generally not associated with an audio/visual threat. The filter module 600 can also be configured to maximise analysis of requesting entities 210 and target entities 220 which are generally associated with an audio/visual threat. A more detailed explanation of the filter module 600 is provided later in this document.

In the event that the target entity 220 and/or the requesting entity 210 of the request 200 are identified as being suspicious by the filter module 600, the method 500 proceeds to step 550. Otherwise the activity 230 of the request 200 is allowed to be performed.

At step 550, the method 500 comprises determining, using the analysis module 480, if the processing system exhibits behaviour associated an audio/visual threat.

The analysis module 480 is passed data indicative of at least one of the requesting entity 210 and the target entity 220. The analysis module 480 comprises a behaviour analysis sub-module 910 having a plurality of behaviour rules which can be applied to at least one of the requesting entity 210 and the target entity 220 to determine if the processing system 100 exhibits illegitimate behaviour generally associated with an audio/visual threat. In an optional form, the behaviour analysis sub-module 480 comprises a plurality of behaviour rules which when applied determine if the processing system exhibits legitimate behaviour which is not generally associated with an audio/visual threat. It will be appreciated that illegitimate and legitimate behaviour can be detected simultaneously using the behaviour rules.

At step 560, the method 500 comprises determining, based on the results of the behaviour analysis performed in step 550, whether the processing system 100 exhibits behaviour associated with an audio/visual threat.

The analysis module 480 can be configured to determine if a threshold number of illegitimate behaviour rules are satisfied, indicating that the request 200 is associated with an audio/visual threat. In another form, if legitimate behaviour rules are also applied during the behaviour analysis, the difference between the number of satisfied illegitimate and legitimate behaviour rules can be compared to the threshold number to determine if the request 200 is associated with an audio/visual threat.

In another form, the analysis module 480 comprises a threat assessment sub-module 990 which is configured to determine a threat value using at least the results of the behaviour analysis. The threat value can be used in comparisons to a threat threshold value to determine if the request 200 is associated with an audio/visual threat. The threat assessment sub-module 990 will be explained in more detail later in this document.

In response to a determination that the request 200 is associated with an audio/visual threat, the method 500 proceeds to step 570 where the request 200 to perform the activity 230 associated with the audio/visual threat is restricted.

Restricting the activity 230 can be performed by the interception module 470 by failing to call the API procedure. In another form, an operating system defined error code may be returned to the requesting entity 210. In an alternative form, audio and/or visual data may be modified or replaced with predefined, random and or invalid data, and subsequently an operating system defined success code is returned to the requesting entity 210.

In other forms, the restriction module 490 can be used to terminate the requesting entity 210 associated with the request 200. Additionally or alternatively, a main executable entity associated with the requesting entity 210 and/or target entity 220 may be removed from the processing system's memory. In an additional or alternate form, data indicative of the main executable entity and/or one or more related entities associated with the requesting entity 210 and/or target entity of the request 200 is transferred to a server processing system 160 for further analysis. It will be appreciated that a combination of the above approaches can be used to restrict the audio/visual threat.

In response to a negative determination, the method 500 proceeds to step 580 where the request 200 to perform the activity 230 is satisfied. This may comprise passing the parameters to the API procedure, as explained in FIG. 3.

Optionally the method 500 can comprise informing a user of the processing system 100 of the detection of the audio/visual threat 230; prompting the user of the processing system 100 regarding the detected audio/visual threat and optionally receiving input from the user regarding steps to deal with the malicious activity (ie. deny the activity 230, or allow the activity 230). In the event that the processing system 100 in this example is a client processing system 810, the method 500 can optionally comprise reporting the detection of the audio/visual threat to the server processing system 840.

Figure 6:
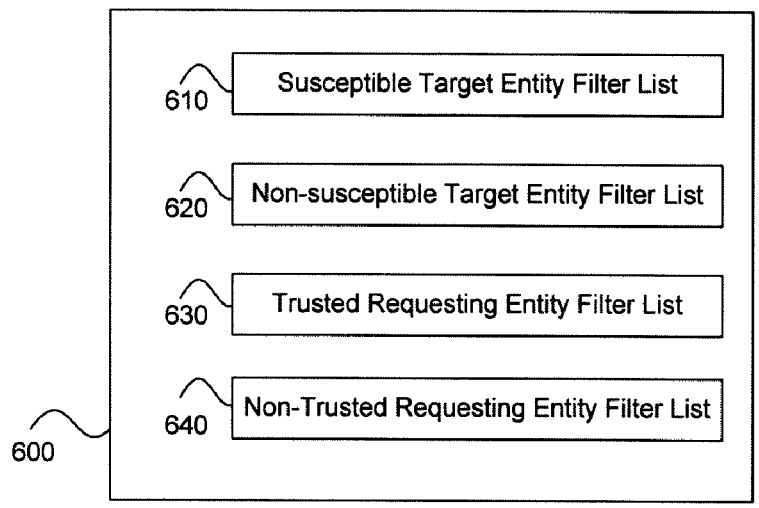
FIG. 6 is a block diagram illustrating an example of a filter module.

Referring to FIG. 6, there is shown a block diagram illustrating an example of the filter module 600. The filter module 600 comprises a number of lists of filter rules for filtering intercepted requests 200. The filter module 600 can comprise at least one of a susceptible target entity filter list 610, a non-susceptible target entity filter list 620, a trusted requesting entity filter list 630, and a non-trusted requesting entity filter list 640.

The susceptible target entity filter list 610 comprises one or more target entity filter rules which, when applied to a target entity, determine if the target entity 220 relating to the intercepted request 200 is of interest, thereby identifying that the request 200 is suspicious. For example, a common back door entity in a processing system 100 may be known to be susceptible to an audio/visual threat. One of the target entity filtering rules may require a comparison of the name of the target entity 220 to the name of the common back door entity, and if the susceptible target entity rule is satisfied, the target entity 220 is considered of interest, therefore identifying the request 200 as suspicious.

The non-susceptible target entity filter list 620 comprises one or more target entity filter rules which, when applied to a target entity, filter out target entities 220 which are not susceptible to malicious activity and thus are not considered of interest, thereby identifying the request 200 as non-suspicious. By using the non-susceptible target entity filter list 620, an activity 230 that occurs in relation to a non-susceptible target entity 220 can be dismissed as being associated with an audio/visual threat, and thus analysis does not need to be performed in relation to the request 200.

The trusted requesting entity filter list 630 comprises one or more requesting entity filter rules which when applied, filter out trusted requesting entities 210 which are not considered of interest (ie. there is a high probability that the requesting entity 210 is not associated with a malicious request), thereby identifying that the request 230 is non-suspicious.

The non-trusted requesting entity filter list 640 is similar to the susceptible target entity filter list 610 except this list 640 comprises one or more requesting entity filter rules to identify requesting entities 210 which are of interest (ie. there is a high probability that the requesting entity 210 is associated with a malicious request). By identifying a non-trusted requesting entity 210, the request 200 can generally be identified as being suspicious.

Each filter rule in each list can have an associated filter rule identity. When a filter rule is satisfied, an identity of the satisfied filter rule can be recorded. Over time, particular filter rules are satisfied more frequently than others. The frequency which each rule is satisfied can be used to determine a filter rating which can be used to order the rules in each list. As will be described in more detail below, the filter rating can be used to determine an order which a list of filter rules are applied to intercepted requests 200 such that, on average, the number of filter rules used, prior to a filter rule being satisfied, is reduced.

In some instances, a request 200 may have been identified as being non-suspicious using one of the lists of the filter module 600, whereas a different list of the filter module 600 may have identified the same request 200 as being suspicious. In this instance, the worst case scenario should be applied, which would be to identify the request 200 as suspicious. One approach to is to use the susceptible target entity filter list 610 and the non-trusted requesting entity filter list 640 prior to the non-susceptible target entity filter list 620 and the trusted requesting entity filter list 630 such that the worst case scenario is given priority.

In other instances, a request 200 may fail to be identified as suspicious and non-suspicious. In this instance, a default identification can be assigned to the request 200. The default identification may be to identify the request 200 as being suspicious. However, a more lenient approach may be to set the default identification as being non-suspicious. In one form, the default identification can be defined by the user of a processing system 100.

Figure 7:
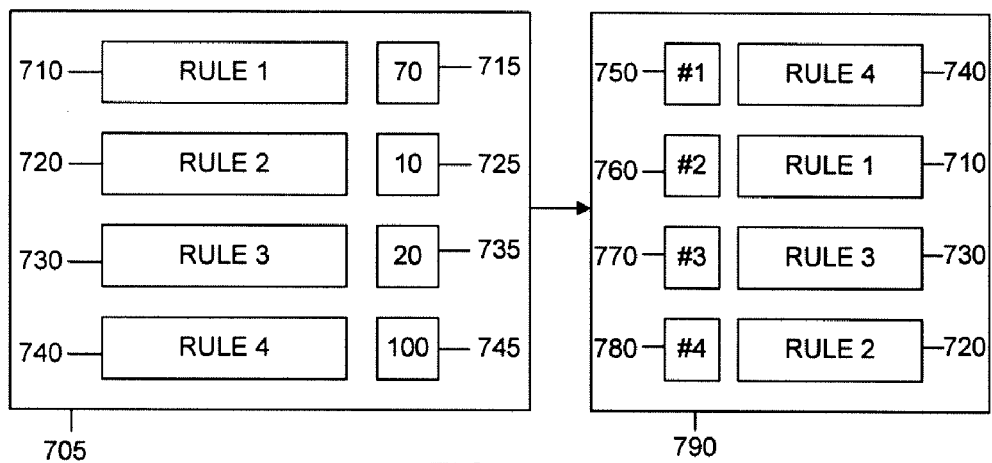
FIG. 7 is a block diagram illustrating an example of determining an order of filter rules of the filter module.

Referring now to FIG. 7, there is shown a block diagram illustrating an example of ordering filter rules to facilitate efficient analysis of intercepted requests 200.

FIG. 7 shows an example list 705 of filter rules 710, 720, 730, 740. Each filter rule has a respective associated filter rating 715, 725, 735, 745. Each filter rating is at least indicative of the frequency that the respective filter rule has been previously satisfied. In this example, "Rule 1" 710 has an associated filter rating 715 of "70" and "Rule 2" 720 has an associated filter rating 725 of "10". This indicates that "Rule 1" has been satisfied more frequently than "Rule 2".

As shown in ordered list 790, the filter rules are ordered in descending order according to the respective filter ratings for each filter rule in the list 705. Thus, "Rule 4" 740 has the highest filter rating and therefore this filter rule is positioned at the start 750 of the list. "Rule 1" has the next highest filter rating and is therefore positioned second 760 in the list, followed by "Rule 3" and then "Rule 2".

This process of determining an order of filter rules can be performed by a single processing system 100 or alternatively in a distributed system. A distributed system 150 advantageously allows the generation of the filter ratings and an order of the filter rules using a larger sample of feedback data obtained from a plurality of client processing systems 180. A single processing system 100 advantageously allows for the determination of filter ratings and an order of the filter rules which are customised for that particular processing system 100.

In a distributed system 150, order data 790 indicative of the order of the list 790 can be transferred to one or more client processing systems 150 such that the order indicated by the order data 790 can be used when applying the filter rules to determine suspicious requests 200. In one form, one of the client processing systems 180 in a distributed system 150 may transfer a request for an updated order of the filter rules, and in response, the server processing system 160 transfers the order data 790 to the requesting client processing system 180. In another additional or alternative form, the server processing system 160 may be scheduled to periodically transfer the order data to the plurality of the client processing systems 180.

Figure 8:
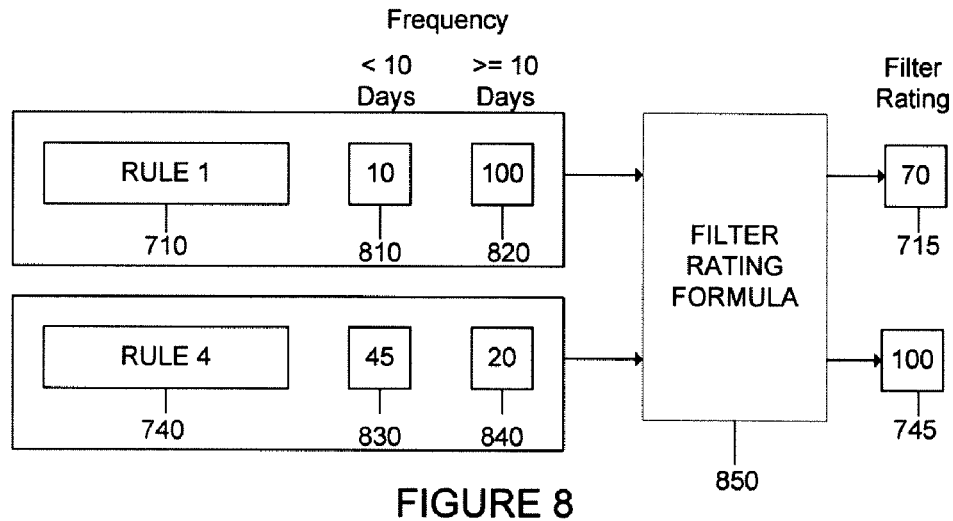
FIG. 8 is a block diagram illustrating an example process of determining filter ratings of filter rules of the filter module.

Referring to FIG. 8, there is shown a block diagram illustrating the determination of filter ratings.

As previously indicated, each filter rule has an associated frequency indicative of the number of times the filter rule has been satisfied. The frequency can be split into a number of portions. In this example, each frequency is split into two portions: a first portion 810, 830 being the frequency that the filter rule had been satisfied within the past ten days; and a second portion 820, 840 being the frequency that the filter rule had been satisfied outside the past ten days.

As seen from FIG. 8, "Rule 1" 710 has been satisfied ten times within the past ten days and has also been satisfied one-hundred times outside the past ten days. "Rule 4" 740 has been satisfied forty-five times within the past ten days and has also been satisfied twenty times outside the past ten days.

This distribution of frequencies can indicate a trend of requests associated with audio/visual threats. For example, in regard to "Rule 1" 710, which may be a susceptible target entity filter rule, there may have been a threat signature which has been recently distributed amongst client processing systems that has resulted in "Rule 1" being satisfied less often compared to past frequencies that occurred outside the ten day period. In regard to "Rule 4" 740, which may also be a susceptible target entity filter rule, there may have been an outbreak of an audio/visual threat which is targeting particular susceptible entities and accordingly "Rule 4" has recently been satisfied more often compared to past frequencies that occurred outside this ten day period, as indicated by the rise of the frequency within the past ten days.

In order to take into account trends in activity associated with an audio/visual threat, such as outbreaks of specific malicious requests and distributions of software patches, a filter rating formula 850 is used to weight the distribution of frequencies for each filter rule. In this example the filter rating formula is shown below:

$$FilterRating = 2 \times recentFreq + 0.5 \times olderFreq$$

Where:
recentFreq=frequency of instances when the rule was satisfied within last 10 days
olderFreq=frequency of instances when the rule was satisfied outside last 10 days It will be appreciated that different weights can be used. Furthermore, it will be appreciated that a larger breakdown of frequency distribution can be used.

As can be seen from the filter rating formula 850, the frequency of instances when the filter rule was satisfied within the past ten days is weighted more heavily in order to take into account recent trends of malicious requests. Thus, the filter rating for "Rule 1" and "Rule 4" are calculated to be:

$$FilterRatingRule1 = 2 \times 10 + 0.5 \times 100 = 20 + 50 = 70$$

$$FilterRatingRule4 = 2 \times 45 + 0.5 \times 20 = 90 + 10 = 100$$

As can be seen from the respective filter ratings 715, 745 for "Rule 1" 710 and "Rule 4" 740, even though "Rule 1" 710 has been satisfied more often in the past, as indicated by frequency 820, it appears that "Rule 4" 740 has recently been satisfied more often (indicated by frequency 830) due to an outbreak of one or more threats targeting susceptible entities which "Rule 4" 740 determines to be of interest. Thus, "Rule 4" 740 receives a higher filter rating 745 compared to the filter rating 715 of "Rule 1" 710 due to the recent trend in malicious requests.

When the list of filter rules is ordered, "Rule 4" 740 is ranked higher in the list compared to "Rule 1" 710 and therefore "Rule 4" 740 is used prior to "Rule 1" 710 when determining suspicious requests. On average, this ordering of the filter rules can reduce the number of applications of filter rules by the filter module 600, thereby resulting in an efficient filtering process.

Figure 9:
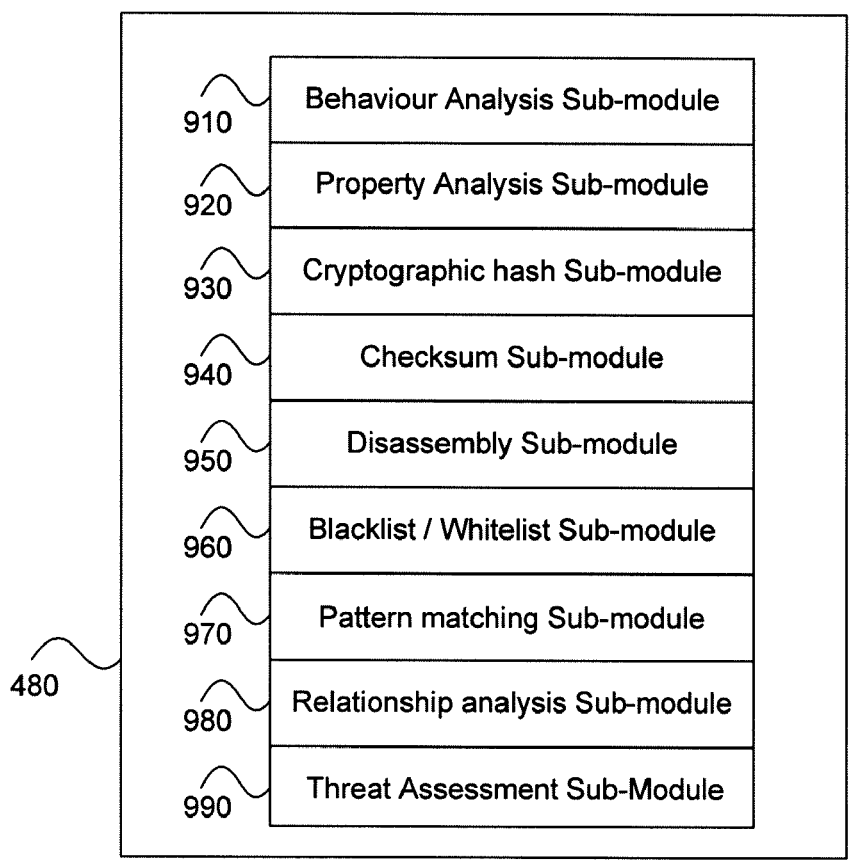
FIG. 9 is a block diagram illustrating an example of an analysis module.

Referring to FIG. 9, there is shown a more detailed block diagram of an example of an analysis module 480. As previously described, the analysis module 480 comprises a number of sub-modules which the analysis module 480 can control and use individually or in combination to determine if the processing system is compromised with an audio/visual threat.

The analysis module 480 can comprise a behaviour analysis sub-module 910, a property analysis sub-module 920, a cryptographic hash sub-module 930, a checksum sub-module 940, a disassembly sub-module 950, a black-list/white-list sub-module 960, a pattern matching sub-module 970, a relationship analysis sub-module 980, and a threat assessment sub-module 990.

Data returned by the above sub-modules can be indicative of whether the one or more entities are associated with an audio/visual threat. However, data returned may require further processing by other sub-modules. Therefore, the analysis module 480 is configured to pass data requiring further processing onto the appropriate sub-module to thereby determine if the one or more entities are associated with an audio/visual threat.

As previously indicated, the behaviour analysis sub-module 910 comprises a plurality of behaviour rules. The analysis module 480 passes the behaviour analysis sub-module 910 one or more entities which require behaviour analysis.

Generally, at least one of the requesting entity and the target entity of the suspicious request are passed to the behaviour analysis sub-module 910 for behaviour analysis. However, other entities can be passed by the analysis module 480 to the behaviour analysis sub-module 910. For example, a group of related entities determined by the relationship analysis sub-module 980 can be passed by the analysis module 480 to the behaviour analysis sub-module 910 to determine if a group of related entities for the suspicious request 479 exhibits behaviour associated with an audio/visual threat.

The behaviour analysis sub-module 910 can comprise the following example behaviour rules:
Is the entity indicative of audio/visual signals being obtained by the one or more communication devices?
Is the entity being interacted with via a graphical user interface currently displayed on the desktop of the processing system?
Is the entity recording data indicative of audio and/or visual data?
Was the entity launched by the user?
Is the entity attempting to connect to a remote network?
Is the entity requesting the activity 230 to be performed at regular intervals?

The behaviour analysis sub-module 910 can return data to the analysis module 480 indicative of the behaviour rules which were satisfied. As will be explained in more detail below in relation to the threat assessment module 990, the number of satisfied behaviour rules, or threat values associated with satisfied behaviour rules can be used to determine whether the processing system is compromised with an audio/visual threat.

The behaviour analysis sub-module 910 may also query the intercepted request log file to determine whether particular behaviour rules are satisfied. For example, the last example behaviour rule above may require a search to be performed of the intercepted request log file to determine if the requesting entity 210 is requesting the activity 230 to be performed at regular intervals. Furthermore, the behaviour analysis sub-module 910 may query the intercepted request log file to determine if a sequence of requests have been intercepted which are indicative of the processing system being compromised with an audio/visual threat.

The property analysis sub-module 920 is configured to determine one or more properties of one or more entities. The property analysis sub-module 920 receives one or more entities from the analysis module 480 and applies one or more property rules to determine one or more properties of the one or more entities which can be used in determining if the processing system has been compromised with an audio/visual threat.

The property analysis sub-module 920 generally receives from the analysis module 480 at least one of the requesting entity 210 and the target entity 220 of a suspicious request 479. However, it will be appreciated that other entities can be passed the property analysis sub-module 920 such as a group of related entities determined by the relationship analysis sub-module 980.

Property rules can be configured to determine illegitimate properties of an entity which is generally associated with an audio/visual threat, and/or legitimate properties of an entity which is not generally associated with an audio/visual threat. The property analysis sub-module 920 can comprise the following example property rules:
Is the entity configured to be hidden in the processing system memory?
Is the entity located in a system directory of the operating system (ie. "C:\Windows\system32\")?
Has the entity been modified recently?
Does the entity have a tray icon?
Does the entity have unlimited file permissions (ie read, write, and execute)

Data indicative of satisfied property rules can be returned to the analysis module 480. As will be explained in more detail regarding the threat assessment sub-module 990, the number of satisfied property rules or threat values associated with satisfied property rules can be used to determine whether the one or more entities are associated with an audio/visual threat.

The cryptographic hash sub-module 930 is configured to generate a cryptographic hash value of an entity received from the analysis module 480. As the cryptographic hash value can be used as an identity, the cryptographic hash value can be used in comparisons with the blacklist/whitelist sub-module to determine whether the target entity 220 and/or requesting entity 210 of the request 200 is associated with an audio/visual threat.

Other entities such as a group of related entities determined by the relationship analysis sub-module 980 can also be passed to the cryptographic hash sub-module 930 to determine if one or more of the entities of the group of related entities is associated with an audio/visual threat. Data indicative of whether the one or more entities is associated with an audio/visual threat is returned to the analysis module 480. If the analysis module 480 receives data indicating that the one or more entities are associated with an audio/visual threat, the analysis module 480 initiates at least one of the interception module 470 and the restriction module 490 to restrict the request 200.

The checksum sub-module 940 is configured to determine a checksum of one or more entities of the processing system 100. The checksum can be compared to a database (blacklist/whitelist module) to determine whether the one or more entities received from the analysis module are malicious. Data indicative of whether the one or more entities is associated with an audio/visual threat is returned to the analysis module 480. If the analysis module 480 receives data indicating that the one or more entities are associated with an audio/visual threat, the analysis module 480 initiates at least one of the interception module 470 and the restriction module 490 to restrict the request 200.

The pattern matching sub-module 950 is configured to search one or more entities, received from the analysis module 480, for particular patterns of strings or instructions which are indicative of malicious audio/visual activity. The pattern matching sub-module 950 may operate in combination with the disassembly module 960. Although strings of instructions can be compared by the pattern matching sub-module 950, the pattern matching sub-module 950 may be configured to perform functional comparisons of groups of instructions to determine whether the functionality of the one or more entities is indicative of an audio/visual threat. Data indicative of whether the one or more entities is associated with an audio/visual threat is returned to the analysis module 480. If the analysis module 480 receives data indicating that the one or more entities are associated with an audio/visual threat, the analysis module 480 initiates at least one of the interception module 470 and the restriction module 490 to restrict the request 200.

The disassembly sub-module 960 is configured to disassemble binary code of one or more entities received from the analysis module 480 such that the disassembly sub-module 960 determines processing system instructions for the entity. The processing system instructions of the one or more entities can then be used by the pattern matching sub-module 960 to determine whether the one or more entities is associated with an audio/visual threat. Data indicative of disassembled instructions are returned to the analysis module 480, wherein the analysis module 480 transfers the disassembled instructions to the pattern matching sub-module 950 to determine whether the one or more disassembled instructions of the one or more entities is associated with an audio/visual threat.

The blacklist/whitelist sub-module 970 comprises a list of malicious and/or non-malicious entities associated with an audio/visual threat. The blacklist/whitelist sub-module 970 may be provided in the form of a table or database which comprises data indicative of malicious and non-malicious entities. The table may comprise checksums and cryptographic hash values for malicious and non-malicious entities. The data stored in the blacklist/whitelist sub-module can be used to determine whether one or more entities received from the analysis module 480 is malicious or non-malicious. Data indicative of whether the one or more entities is associated with an audio/visual threat is returned to the analysis module 480. If the analysis module 480 receives data indicating that the one or more entities are associated with an audio/visual threat, the analysis module 480 initiates at least one of the interception module 470 and the restriction module 490 to restrict the request 200.

Figure 10:
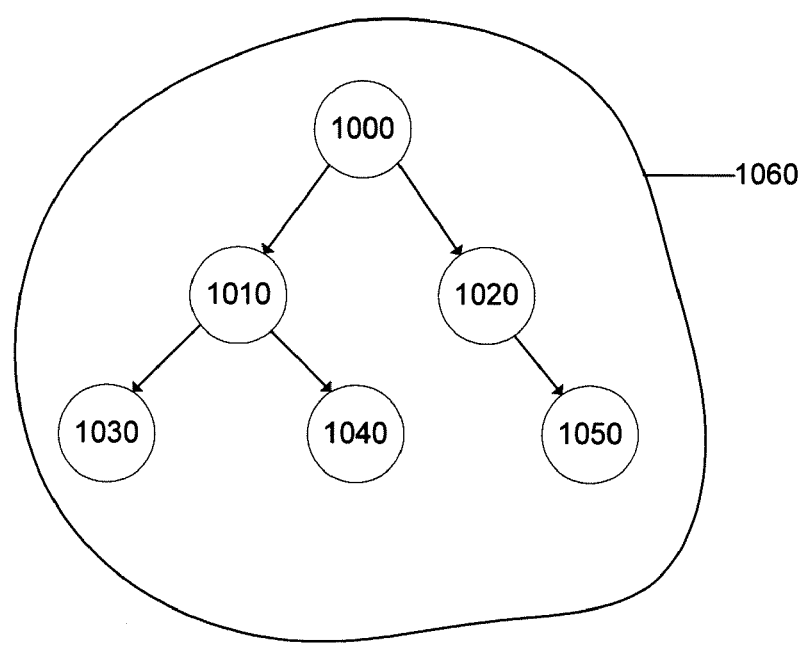
FIG. 10 is a block diagram illustrating an example of a group of related entities.

The relationship analysis sub-module 980 can be used to determine related entities relative to a starting entity 1000. As shown by example in FIG. 10, once a request 200 has been identified as suspicious 479 using the filter module 600, the target entity 220 and/or requesting entity 210 of the suspicious request 200 can be treated as a starting entity 1000, and then using the relationship analysis sub-module 980, a group of related entities 1060 (resembling a web of entities) relative to the starting entity 1000 can be determined. A detailed explanation of detecting one or more related entities is described in the Applicant's co-pending U.S. patent application Ser. No. 11/707,425 and co-pending Australian Patent application AU2007200605 entitled "Determination of related entities", the content of which is herein incorporated by cross-reference.

Generally, threats, such as malware, comprise a bundle of malicious entities. By only considering a single entity by itself, it may not be accurately possible to determine if a target entity 220 and/or requesting entity 210 are malicious. However, by determining a group of related entities 1060 relative to the target entity 220 and/or requesting entity 210, a more accurate assessment can be made in relation to whether or not the request 200 is malicious.

Furthermore, removing a single malicious entity may not necessarily disable the audio/visual threat from performing some malicious activity. Some particular forms of threats can perform repairs in relation to a single malicious entity being removed or disabled. Therefore, detecting a group of related entities 1060 can be beneficial for disabling the threat.

Figure 11A:
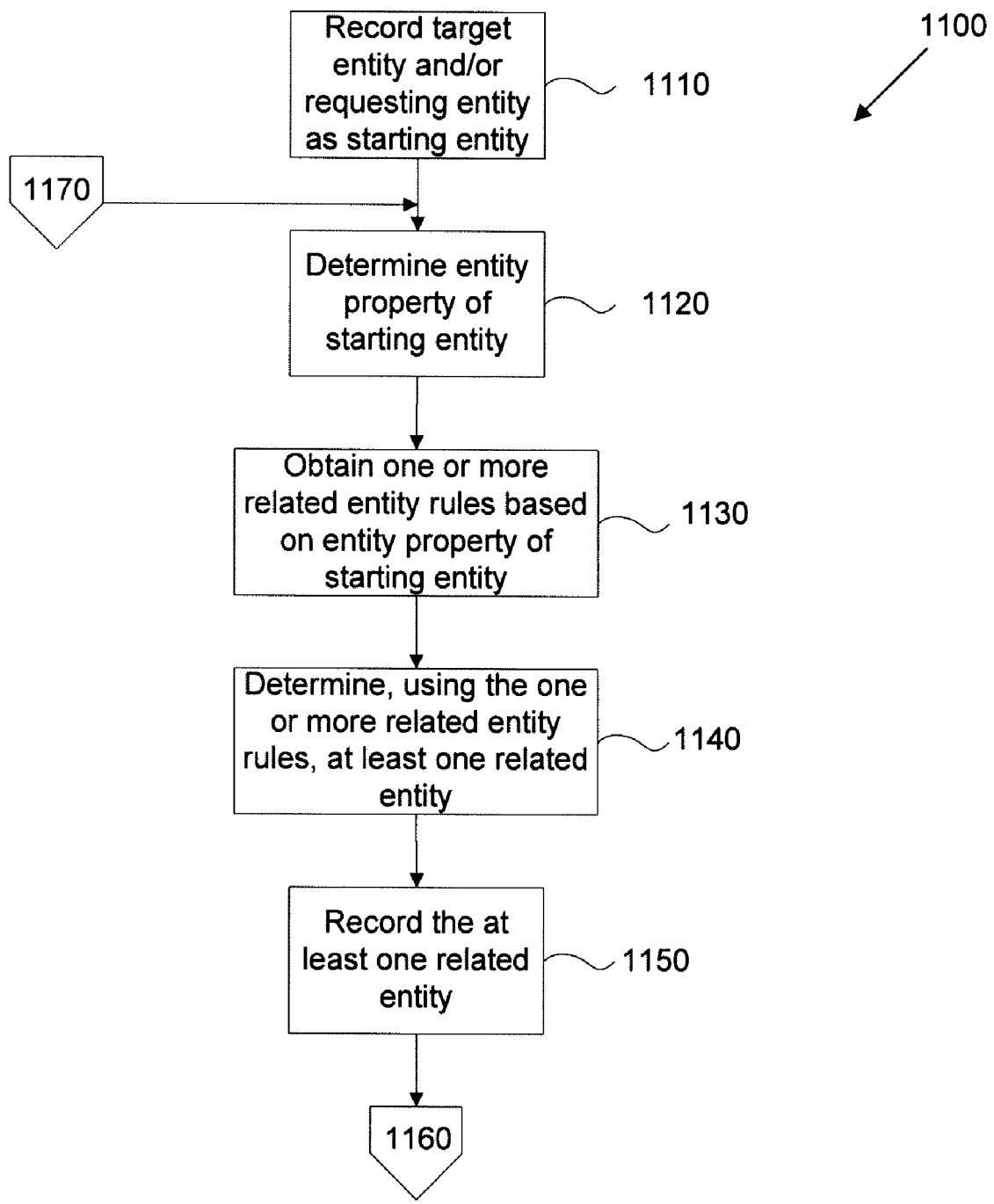
FIGS. 11A and 11B is a flow diagram illustrating an example method to determine related suspicious entities.
Figure 11B:
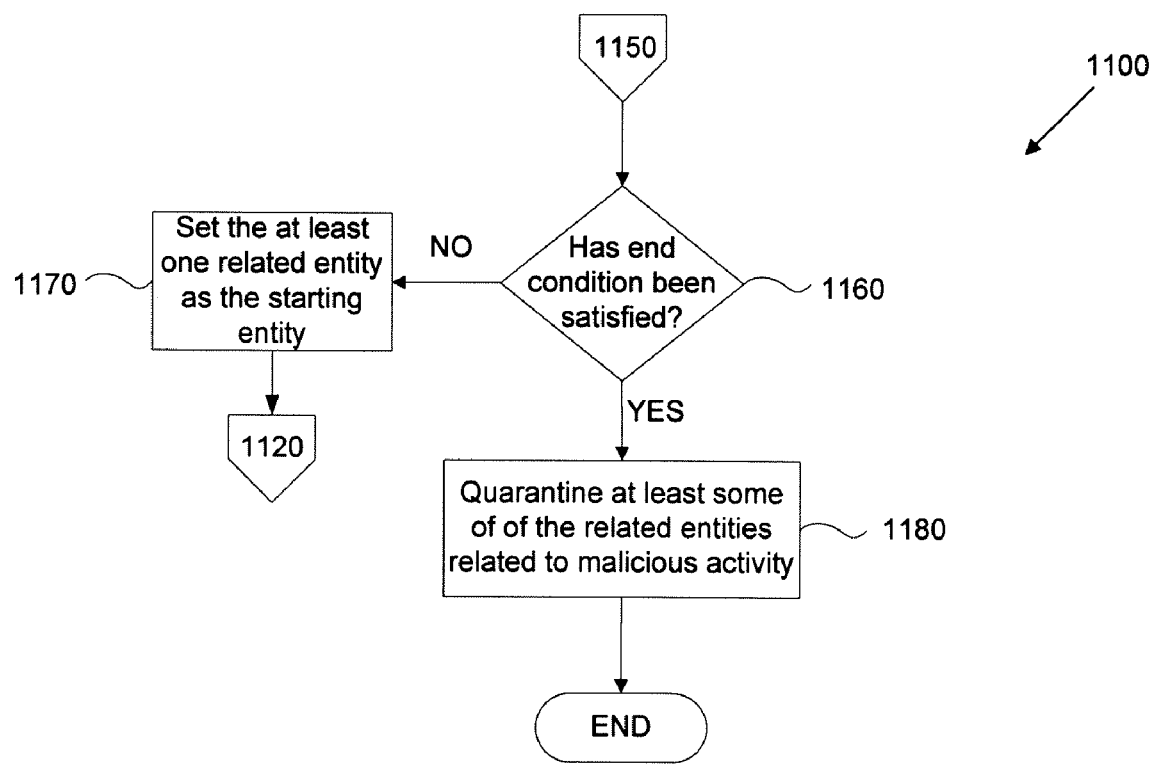

Referring now to FIGS. 11A and 11B, there is shown a method 1100 of determining related entities relative to the starting entity 1000. The method represents the operation of the relationship analysis sub-module 980. Method 1100 determines a group of suspicious related entities relative to the starting entity 1000. However, it will be appreciated that method 1100 can be adapted to determine any form of related entities, such as trusted related entities relative to the starting entity 1000.

At step 1110, the method 1100 comprises recording the starting entity 1000. This generally comprises the processing system 100 recording at least one of the target entity 220 and/or the requesting entity 210 as the starting entity 1000 in the processing system memory, such as a data store. The starting entity 1000 may be stored in the form of a table or list.

At step 1120, the method 1100 comprises determining an entity property associated with the starting entity 1000. The entity property may be an entity type of the entity, such as whether the starting entity 1000 is an executable entity, a run key entity or a dynamic linked library entity. The entity property may also be a time that the starting entity 1000 was created or modified. The entity property may comprise the directory which the starting entity 1000 is contained within. The entity property may also be a vendor name associated with the starting entity 1000. The entity property may also be a particular network address from which the starting entity 1000 was downloaded.

It will be appreciated that more than one entity property may be determined for the starting entity 1000. However, for the purposes of simplicity, throughout this example it will be assumed that one entity property has been determined for the starting entity 1000.

At step 1130, the method 1100 comprises selecting, based on the entity property of the starting entity 1000, one or more related entity rules. In this particular example, the one or more related entity rules take the form of one or more rules for determining suspicious entities related to the starting entity 1000.

Step 1130 can comprise selecting, based on the entity property, the one or more related entity rules from a larger set of related entity rules. Each related entity rule is associated with a particular entity property, and as such, a selection of a related entity rules can be performed based on the entity property of the starting entity 1000. An example list of entity properties and corresponding related entity rules is shown below in List 1.

(i) if the starting entity comprises a vendor name, the at least one suspicious related entity is one or more entities comprising the same vendor name;

(ii) if the starting entity comprises a product name, the at least one suspicious related entity is one or more entities comprising the same product name;

(iii) if the starting entity comprises a version name, the at least one suspicious related entity is one or more entities comprising the same version name;

(iv) if the starting entity was created at a particular time in the one or more processing systems, the at least one suspicious related entity is one or more entities which were created at a similar time to that of the starting entity;

(v) if the starting entity accesses a particular network address or network address range or network address names, the at least one suspicious related entity is one or more entities which also access the same particular network address or network address range or network address names;

(vi) if the starting entity accesses a particular network address or network address range, the at least one suspicious related entity is the particular network address or network address range or network address names;
(vii) if the starting entity causes another process to execute, the at least one suspicious related entity is one or more entities which was executed by it;
(viii) if the starting entity was executed by a process, the at least one suspicious related entity is one or more entities which executed the starting entity;
(ix) if the starting entity creates or modifies an entity, the at least one suspicious related entity is one or more entities which it creates or modifies;
(x) if the starting entity is found in a directory not in a list of whitelist directories, the at least one suspicious related entity is one or more entities which also exist in the same directory;
(xi) if the starting entity is downloaded from the internet/tcpip, the at least one suspicious related entity is one or more entities which were downloaded at the same time or by the same process or from the same particular network address or network address range or network address names;

List 1: Example of Entity Properties and Corresponding Related Entity Rules

It will be appreciated that a more detailed list of entity properties and corresponding related entity rules can be obtained using the above general rules. An example of a more detailed list of entity properties and corresponding related entity rules are provided below.

TABLE 1

Further example of Entity Properties and corresponding related entity rules

| Entity Property | Related Entity Rule |
| --- | --- |
| trigger entity | The one or more suspicious related entities are triggerable entities which are triggerable by the run-key entity |
| executable entity | The one or more suspicious related entities are one or more files in an INF file associated with the starting entity |
| executable entity | The one or more suspicious related entities are one or more trigger entities which trigger the starting entity |
| executable entity | The one or more suspicious related entities are one or more favourites which trigger the starting entity |
| executable entity | The one or more suspicious related entities are one or more items of embedded executable content inside the starting entity |
| executable entity | The one or more suspicious related entities are one or more instances of windows created by the executable entity |
| executable entity | The one or more suspicious related entities are one or more desktop link files (short cuts) which trigger the executable entity |
| executable entity | The one or more suspicious related entities are one or more modules loaded by the starting entity |
| executable entity | The one or more suspicious related entities are one or more classids or guids associated with the starting entity |
| executable entity | The one or more suspicious related entities are one or more network addresses or network address ranges or network address names associated with the starting entity |
| classid/guid entity | The one or more suspicious related entities are one or more BHO or TOOLBAR names associated with the classid/guid |
| classid/guid entity | The one or more suspicious related entities are one or more one or more class names associated with the classid/guid |
| classid/guid entity | The one or more suspicious related entities are one or more network addresses or network address ranges or network address names associated with the starting entity |
| classid/guid entity | The one or more suspicious related entities are one or more executable entities related to the classid/guid |
| module entity | The one or more suspicious related entities are one or more executable entities that are loaded by the module entity |
| network address/network address range/network address name | The one or more suspicious related entities are one or more files associated with the network address or network address range or network address name |
| network address/network address range/network address name | The one or more suspicious related entities are one or more links or short cuts associated with the network address or network address range or network address name |
| network address/network address range/network address name | The one or more suspicious related entities are one or more classids associated with the starting entity |
| network address/network address range/network address name | The one or more suspicious related entities are one or more favourites associated to the starting entity |
| network address/network address range/network address name | The one or more suspicious related entities are one or more executable entities related to the starting entity |
| network address/network address range/network address name | The one or more suspicious related entities are one or more start pages related to the starting entity |
| network address/network address range/network address name | The one or more suspicious related entities are one or more cookies related to the starting entity |

TABLE 1-continued

Further example of Entity Properties and corresponding related entity rules

| Entity Property | Related Entity Rule |
| --- | --- |
| BHO Tool Bar entity | The one or more suspicious related entities are one or more classids associated with the starting entity |
| BHO Tool Bar entity | The one or more suspicious related entities are one or more names associated with the starting entity |
| BHO Tool Bar entity | The one or more suspicious related entities are one or more executable entities executed by the starting entity |
| Favourites entity | The one or more suspicious related entities are one or more network addresses or network address ranges or network address names |
| Favourites entity | The one or more suspicious related entities are one or more executable entities executed by the starting entity |
| Links entity | The one or more suspicious related entities are one or more network addresses or network address ranges or network address names |
| Links entity | The one or more suspicious related entities are one ore more executable entities executed by the starting entity |
| Cookie entity | The one or more suspicious related entities are one or more network addresses or network address ranges or network address names associated with the starting entity |
| windows instance entity | The one or more suspicious related entities are one ore more executable entities that create the starting entity |
| Directory (not in a whitelist) entity | The one or more suspicious related entities are one or more entities that exist in that same directory. |
| INF entity | The one or more suspicious related entities are one or more entities referenced in the starting entity |
| Archive entity | The one or more suspicious related entities are one ore more entities within the archive entity |
| Archive entity | The one or more suspicious related entities are one or more entities in the same directory as the archive entity which fail to appear in a whitelist |
| vendor name of entity | The one or more suspicious related entities are one or more entities which share the same vendor name as the starting entity |
| product name entity | The one or more suspicious related entities are one or more entities which share the same product name as the starting entity |
| version name | The one or more suspicious related entities are one or more entities which share the same version name as the starting entity |
| Creation/Modification time of entity | The one or more suspicious related entities are one or more entities which have a similar creation/modification time |

It will be appreciated that a starting entity having a trigger entity property could be any one of the following entities: run keys, Appinit, Uninstall Key, Service, Hooks, protocol filter, and a startup list. It will further be appreciated that a starting entity having an executable entity property could be any one of the following entities: executables, dynamic linked libraries, and other modules.

It will be appreciated from List 1 that the general entity properties and related entity rules can be extended to specific entity types, such as the entity types shown in Table 1, for example INF entities, Cookies entity, windows instance entity and the like shown above. The more specific rules in Table 1 allow for a more specific selection of rules based on the more specific entity property, which can therefore result in accurately determining the relevant related entity rules.

It will also be appreciated from Table 1 that more than one related entity rule can be obtained based on the one or more entity properties of the starting entity. As shown above in Table 1, if the entity property indicates that the starting entity is an executable entity, then nine separate types of related entity rules can be applicable for determining the related entities to the starting entity which are considered suspicious.

Additionally or alternatively, in a distributed system 150, the client processing system 160 may transfer, to a server processing system 180, one or more entity properties of the starting entity 1000, and receive, from the server processing system 180, the one or more related entity rules. In this step, the server processing system 180 may select the one or more related entity rules using the entity property from a server set of related entity rules, and then transfer the one or more related entity rules to the processing system 100.

At step 1140, the method 1100 comprises determining, using the one or more related entity rules, the at least one related entity 1010, 1020. In this particular example the related entity rules determine related suspicious entities. For simplicity purposes, the following example is presented using one related entity rule. However, it will be appreciated that more than one related entity rule can be used. Using an example entity of "Spywarz.exe" which has an entity property of a vendor name equalling "Spywarz Software Enterprises", the following related entity rule can be obtained:

"The one or more related entities have a vendor name equalling 'Spywarz Software Enterprises'".

This related entity rule is then used to determine one or more entities in the processing system 100 which satisfy this rule. Once a scan has been performed using the related entity rule, it is determined that "Spywarz.dll" also shares a vendor name of 'Spywarz Software Enterprises'. As the related entity rule has been satisfied, 'Spywarz.dll' is considered a related entity to the starting entity 'Spywarz.exe'. As such, a group of suspicious related entities has been determined which comprises 'Spywarz.exe' and 'Spywarz.dll'.

Optionally, weighted values may be associated with the related entity rules.

Steps 1110 to 1140 represent a single iteration to determine a group of suspicious related entities 1000, 1010, 1020. However, if a more detailed group of related entities is required, it is possible to perform multiple iterations of steps 1110 to 1140, as will now be discussed.

At step 1150, the at least one related entity 1010, 1020 is recorded. This may involve adding the at least one related entity 1010, 1020 to a list or a table which comprises the starting entity 1000 recorded at step 1110. Furthermore, the list or table may comprise data indicative of the relationship between the at least one related entity 1010, 1020 and entities which have been previously recorded.

At step 1160, the method 1100 comprises determining if an end condition has been met. For example, the end condition may be satisfied when no new related entities are determined; when a period of time or a number of processing cycles have elapsed; when the current starting entity has an entity type which is indicative of the end condition; and/or when a selected number of repetitions have been performed. If the end condition has not been met, the method continues to step 1170.

At step 1170, the method 1100 comprises setting the at least one related entity 1010, 1020 as the starting entity 1000. This may be performed in memory by reassigning the value of the starting entity 1000. By setting the at least one related entity 1010, 1020 as the starting entity 1000, steps 1120 to 1150 can be repeated until an end condition is met. After step 1170, the method proceeds back to step 1120 to perform the next iteration, therefore determining the related entities for the newly set starting entity. As such, a web or network of related entities is determined until the end condition is met.

Once the end condition is satisfied, the determination of the group of suspicious related entities 1060 has been completed. At step 1180, at least some of the related entities can be quarantined, as will be discussed in more detail below.

Optionally, data indicative of direct or indirect links between entities in the group can be recorded. For example, 'Spywarz.exe' and 'Spywarz.dll' for the above example would have a direct link. However, if a subsequent related entity to 'Spywarz.dll' was determined to be a system variable 'SPYWARZ_VARIABLE', then there would be an indirect link between 'Spywarz.exe' and 'SPYWARZ_VARIABLE'. The number of links between the original starting entity 1000 and other related entities in the group is referred to herein as the "link distance".

Once a group of suspicious entities has been obtained using the relationship analysis sub-module 980, the group of related entities 1060 can be returned to the analysis module. The analysis module can then pass the group of related entities to one or more of the other sub-modules to determine if the group of related entities is associated with an audio/visual threat. Optionally, data indicative of link distances may be also returned to the analysis module.

The threat assessment sub-module 990 is configured to determine, using the received data from the analysis module 480, a threat value indicative of the risk which the one or more suspicious entities represents to the processing system. A detailed explanation of the threat assessment sub-module is described in the Applicant's co-pending U.S. patent application Ser. No. 11/829,592 and co-pending Australian Patent application 2007203543 entitled "Threat Identification", the content of which is herein incorporated by cross-reference.

The threat assessment sub-module 990 receives, from the analysis module 480, data indicative of one or more satisfied behaviour rules for one or more suspicious entities, and one or more satisfied property rules for one or more suspicious entities. The one or more suspicious entities may be a group of related entities 1060. The one or more suspicious entities can be the target entity 220 and/or the requesting entity 210 of a suspicious request 479. Additional data may be received by the threat assessment module 990 indicative of the original starting entity 1000 of the group of related entities 1060, and the relatedness of related entities in the group relative to the starting entity 1000. The relatedness of entities may be provided in the form of link distances.

The determined threat value can then be compared to a threshold to determine if the one or more suspicious entities are malicious. Data indicative of whether the one or more suspicious entities is malicious is returned to the analysis module 480, wherein the analysis module 480 passes control and results of the analysis to the interception module 470 and/or the restriction module 490, where either the request 200 is restricted or allowed to be performed in accordance with the results of the analysis.

The threat value can take three different forms: an entity threat value (ETV), a relational entity threat value (RETV), and a group threat value (GTV). Each of these values, and a method for calculating each, will be discussed in more detail below.

An ETV is indicative of the threat that a single suspicious entity represents to the processing system.

The threat assessment sub-module 990 can be configured to determine a characteristic threat value (CTV) for each satisfied behaviour rule and/or property rule for the suspicious entity. The threat assessment sub-module 990 can comprise a CTV formula associated with each behaviour rule and/or property rule used by the behaviour analysis sub-module 910 and the property analysis sub-module 920. If a behaviour or property rule has been satisfied, as indicated by the received data, the corresponding CTV formula is used to calculate the CTV for the respective behaviour or property rule for the entity. The CTVs are then used by the threat assessment sub-module 990 to determine the ETV for the suspicious entity.

Some CTV formulas can be configured to assign a constant CTV for the satisfied behaviour rule or property rule. For example, if the suspicious entity has a hidden property, the associated CTV formula may assign a constant value indicative a level of threat that the hidden property represents to the processing system 100, as shown below:

$$CTV=0.3$$

In additional or alternative forms, CTV formulas can be configured to use a recorded frequency as an input when calculating the CTV. For example, if one of the satisfied behaviour rules indicates that the suspicious entity has caused the processing system to connect to a remote network address on ten occasions, the CTV is adjusted according to the frequency of the behaviour, as shown below:

$$CTV=0.01 \times freq=0.01 \times 10=0.1$$

The frequency may also be determined for a period of time. For example, if the suspicious entity is connected to the remote network address on ten instances within the past five minutes, then the CTV is adjusted accordingly for this frequency within this period of time. The frequency over a period of time may be determined by the analysis module using the intercepted request log file.

In further additional or alternative forms, at least one CTV is temporally dependent. The CTV formula can be configured to calculate the CTV using a temporal value. For example, a suspicious entity may have connected to a remote network ten days ago. Again, the temporal value may be determined using the intercepted request log file. This period of time is used by the CTV formula in determining the CTV, as shown below:

$$CTV = 0.1 \times e^{\frac{1}{Time}} = 0.1 \times e^{\frac{1}{10}} = 0.1 \times 1.11 = 0.12$$

In the event that the suspicious entity caused the processing system 100 to connect to the remote network address one day ago, the CTV would be calculated as:

$$CTV = 0.1 \times e^{\frac{1}{Time}} = 0.1 \times e^{\frac{1}{1}} = 0.1 \times 2.72 = 0.27$$

As can be seen from the above CTVs, the CTV formulas can be configured to determine a CTV according to how malicious the behaviour or property rule satisfied is considered for the processing system.

As previously discussed, behaviour and property rules can be indicative of non-malicious and malicious activity. CTVs for legitimate characteristics and illegitimate characteristics can be calculated using the associated CTV formulas. In one form, illegitimate characteristics have a positive CTV, and legitimate characteristics have a negative CTV. However, it will be appreciated that this is not essential.

Once CTVs for the satisfied behaviour and property rules have been determined, the threat assessment module determines an ETV for the suspicious entity using the determined CTVs.

For example, a suspicious entity may have the following CTVs:

CTV1=0.1

CTV2=0.5

CTV3=0.7

CTV4=−0.4

Referring to the above CTVs, four characteristics of the suspicious entity have been determined. Three of the characteristics are illegitimate (as indicated by the positive CTVs) and one of the characteristics is legitimate (as indicated by the negative CTV 1770). The ETV can be determined by summing the CTVs for the suspicious entity. In this example the ETV would be calculated as:

$$ETV = \sum_{x=1}^{4} CTVx = 0.1 + 0.5 + 0.7 - 0.4 = 0.9$$

In some instances an ETV may have been previously calculated for the suspicious entity and recorded in the processing system's 100 memory. In this event, the new ETV can be determined by using the CTVs and the previously stored ETV. The previous stored ETV can be weighted accordingly.

The threat assessment module is configured to compare the ETV of the suspicious entity to the ETT to determine if the suspicious entity of the suspicious request is considered malicious. In one form, if the ETV is greater than or equal to the ETT, the suspicious entity is identified as being malicious.

For example, the ETT may be equal to '0.85'. In this example the ETV equals '0.9' which is greater than the ETT. Therefore, the suspicious entity is identified as being a malicious entity, thereby identifying that the processing system has been compromised with an audio/visual threat.

An RETV is a threat value for a single suspicious entity which is calculated according to one or more adjusted ETVs of related suspicious entities relative to the single suspicious entity. In this instance, the single suspicious entity is a starting entity in the group of related entities.

Figure 12:
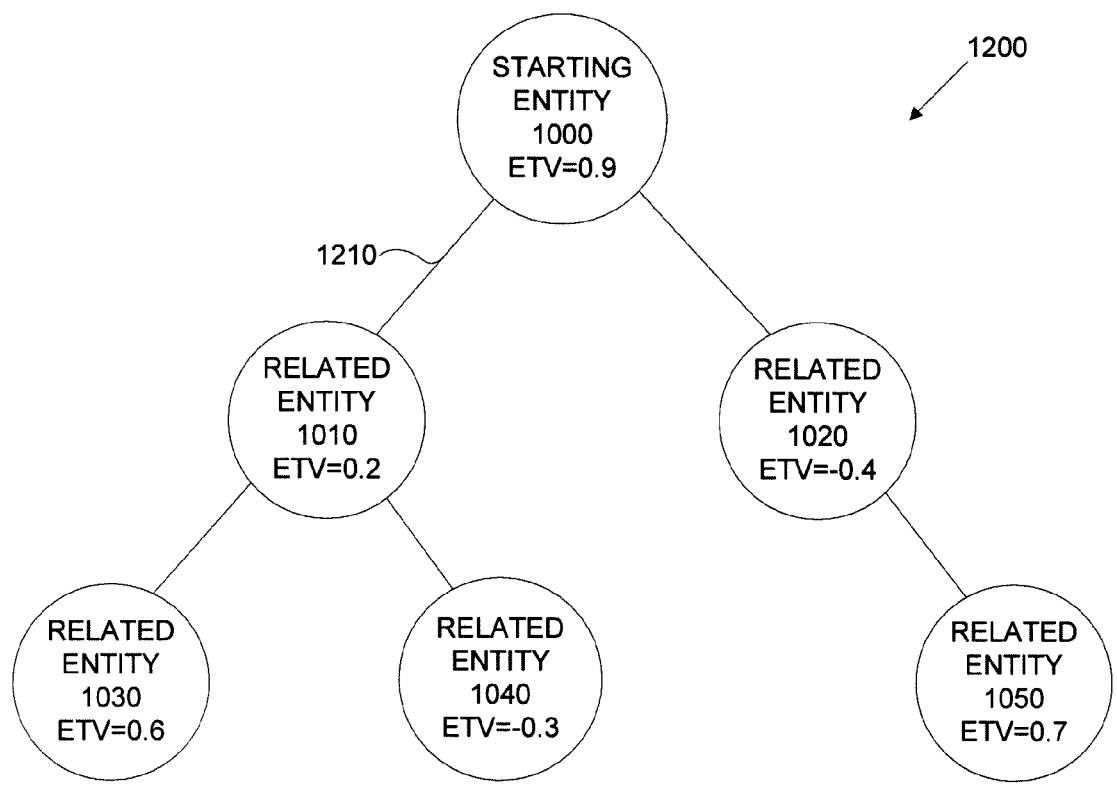
FIG. 12 is a block diagram illustrating an example of a group of related entities with corresponding entity threat values (ETV).

Referring to FIG. 12, there is shown a group of related entities 1200 and corresponding ETVs for each entity in the group. The RETV can be calculated by summing ETVs for each entity in the group which is adjusted according to the relatedness of each entity relative to the starting entity. In one form, the link distance is used to adjust the ETVs for each entity in the group.

Therefore, a related entity which has a direct link (ie. a low link distance) to the starting entity 1000 is given more weight compared to a related entity which has an indirect link (ie. a higher link distance) to the starting entity 1000. The higher the link distance, the less weight is provided for the respective ETV when calculating the RETV. An example RETV formula to calculate the RETV is provided below:

$$RETV = \Sigma ETV \times 0.5^{LinkDist}$$

Where:

LinkDist is the link distance

For example, the RETV for the group of related entities 1200 illustrated in FIG. 12 would be calculated as:

$$RETV = \Sigma ETV \times 0.5^{LinkDist}$$

$$RETV = 0.9 \times 0.5^0 + (0.2 - 0.4) \times 0.5^1 + (0.6 - 0.3 + 0.7) \times 0.5$$

$$RETV = 0.9 - 0.1 + 0.05 = 0.85$$

The RETV can then be compared to a relational entity threat threshold (RETT) to determine whether the suspicious entity 1000, based at least partially on the related entities 1010, 1020, 1030, 1040, 1050, is malicious. In this example, the RETT may be '0.8'. Therefore, the RETV is greater than RETT, thereby identifying the starting entity 1000 as a malicious entity, and thereby identifying that the processing system is compromised with an audio/visual threat.

The GTV can be calculated by summing the ETVs for each entity 1000, 1010, 1020, 1030, 1040, 1050 in the group of related entities 1200, and then averaging the sum over the number of entities in the group 1200. An example GTV formula to calculate the GTV is provided below:

$$GTV = \frac{\sum ETV}{n}$$

where n is the number of entities in the group of related entities 1200

Referring to the group of related entities 1200 shown in FIG. 12, the GTV would be calculated as:

$$GTV = \frac{\sum ETV}{n}$$

$$GTV = \frac{0.5 + 0.2 - 0.4 + 0.6 - 0.3 + 0.7}{6}$$

$$GTV = \frac{1.3}{6} = 0.22$$

The GTV can then be compared to a group threat threshold (GTT) to determine whether the group of related entities 1200 is malicious, or whether at least a portion of the related entities 1200 is malicious. In this example, the GTT may be '0.2'. In this instance, the GTV is more than the GTT which indicates that the group of related entities 1200 is malicious, thereby identifying that the processing system has been compromised with an audio/visual threat.

Example pseudo-code to implement an embodiment of the present invention is provided below:

```
main PROCEDURE
BEGIN
    CALL function to set up interception of system APIs
    IF a call to intercepted system APIs
        THEN execute interceptEvent PROCEDURE
END
interceptEvent PROCEDURE
BEGIN
    CALL behaviour analysis procedure
    IF behaviour analysis procedure returns OK THEN BEGIN
        pass parameters to intended system API
        return result
    END ELSE BEGIN
        IF mode == prompt THEN BEGIN
            Action = CALL prompt user function
        END ELSE BEGIN
            Action = CALL determine action function
        END
        CALL perform action function (Action)
        CALL notify user with action details
    END
END
```

Optionally, the one or more client processing systems 180 may receive, one or more updated behaviour rules, property rules, filter rules and/or related entity rules. The one or more client processing systems 180 may receive updated rules from the server processing system 160 or via a data store such as a compact disk or the like.

Optionally, the one or more client processing systems 180 may receive one or more updated formulas. The updated formulas can comprise one or more updated CTV formulas, ETV formulas, RETV formulas and GTV formulas.

In another optional form, the one or more client processing systems 180 may receive one or more updated thresholds. The updated thresholds can comprise one or more updated ETT, RETT and GTT.

In one form, statistical processes, fuzzy logic processes and/or heuristical processes can be used in combination with filter rules, the related entity rules and/or the malicious assessment rules to determine whether a rule has been satisfied.

The embodiments discussed may be implemented separately or in any combination as a software package or component. Such software can then be used to pro-actively notify, restrict, and/or prevent malicious activity being performed. Various embodiments can be implemented for use with the Microsoft Windows operating system or any other modern operating system.

In one optional form, although four types of filter lists 610, 620, 630, 640 have been herein described for the filter module 600, these filter lists 610, 620, 630, 640 can be used separately or in combination.

In another optional form, the user may define user defined filter rules. For example, there may be an activity 230 in the client processing system 180 which is being analysed by the analysis module 480, however, the user is aware that the activity 230 is not associated with an audio/visual threat. As such, the user is able to define a user defined rule such as to prevent the request 200 being analysed by the analysis module 480. In one form, user defined filter rules are applied prior to the other filter rules.

In optional forms, a mode of operation of an entity may be used to weight the ETV, the RETV or the GTV. For example, an entity may be operating in an administrative mode when it was recorded connecting to a remote network address. The entity is therefore considered a high threat and therefore the ETV for the entity is weighted accordingly to indicate this high risk threat.

In other optional forms, the method of installation for an entity, or installation files associated with an entity, can be analysed to determine one or more characteristics of an entity to allow the identification of a malicious entity. Such analysis may comprise determining: whether an installation file was automatically executed without user input; whether the installation file is designed to delete itself after execution; whether the installation file is not an executable file; whether the installation file does not create a new sub-directory in the processing system 100; whether the installation file does not install itself in "add and remove wizards" of the operating system; whether the installation file uses hidden or deceptive methods to install the entity, such as using run keys; whether the installation file is configured to install the entity in a directory which comprises a large number of other entities; whether the installation file was not initially downloaded using an Internet browser; whether the installation file does not download ongoing updates using an Internet browser and/or requesting user input; and whether the installation file uses social engineering to install the entity (ie "SCVHOST.exe" instead of "SVCHOST.exe").

Other characteristics that can be determined regarding an entity can comprise: where the entity was downloaded from (ie which country); run-key changes performed by the entity; contents of the entity; whether the entity creates auto-startup points; the type of packer/compression means used in relation to the entity. Associated CTV formulas can be used to calculate an appropriate CTV indicative of the severity of the threat which the characteristic represents to the processing system 100. For example, if the entity was downloaded from the US, a small CTV may be calculated which contrasts to an entity which was downloaded from Russia which may result in a large CTV being calculated due to entities being downloaded from Russia being considered to represent a more severe threat to the processing system 100.

In another form, when particular criteria are met in the processing system, one or more local communication devices are locked from operating. For example, if the processing system 100 has not been used for a period of time, and a screen saver is activated, the method may comprise deactivating one or more of the communication devices. This may be performed by intercepting an API call to initiate the screen saver, wherein the intercepting hook function deactivates one or more of the communications devices as the screen saver is being activated.

The embodiments described throughout can be implemented via hardware, software or a combination of both.

Optional embodiments of the present invention may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although a preferred embodiment has been described in detail, it should be understood that various changes, substi- The claims defining the invention are as follows:

1. A method of detecting if a processing system has been compromised with audio/visual threat, wherein the method comprises:
   identifying a requesting entity and a target entity, wherein the requesting entity originates one or more requests to perform an activity in relation to the target entity, and wherein the target entity comprises an audio and/or visual communication device of the processing system;
   intercepting the one or more requests to perform the activity associated with the audio and/or visual communication device of the processing system;
   recording the intercepted one or more requests and properties associated with the requesting entity and the target entity in an intercepted request log file; and
   performing a behavioural analysis of a trend in the processing system using the intercepted request log file to determine if the processing system exhibits behavioural characteristics indicative of the processing system having been compromised with an audio/visual threat.

2. The method according to claim 1, wherein the method comprises:
   determining, using the request to perform the activity, an entity associated with the activity; and
   performing the behavioural analysis in relation to the entity.

3. The method according to claim 2, wherein performing the behavioural analysis comprises applying one or more behavioural rules.

4. The method according to claim 3, wherein the one or more behavioural rules comprises at least one of:
   determining if the entity indicative of at least one of audio signal and visual signals being obtained by the audio and/or visual communication device;
   determining if the entity is being interacted via a graphical user interface currently displayed on the desktop of the processing system;
   determining if the entity is recording data indicative of at least one of audio data and visual data;
   determining if the entity was launched by the user;
   determining if the entity is attempting to connect to a remote network; and
   determining if the entity is requesting the activity to be performed at regular intervals.

5. The method according to claim 1, wherein a requesting entity requests the activity to be performed in relation to a target entity, wherein the method comprises:
   determining, using a filter module, if the activity is suspicious or non-suspicious; and
   in response to determining that the activity is suspicious, analysing, using an analysis module, at least one of the activity, the requesting entity and the target entity.

6. The method according to claim 5, wherein the filter module filters the activity according to the requesting entity and the target entity to determine if the activity is suspicious or non-suspicious.

7. The method according to claim 5, wherein the analysis module comprises a list of activity sequences indicative of an audio/visual threat, wherein analysing the suspicious activity comprises comparing the suspicious activity and at least one of activities which occurred prior to the suspicious activity and activities which occurred after the suspicious activity to the list of activity sequences, wherein in response to a positive comparison, the activity is determined to be associated with an audio/visual threat.

8. The method according to claim 1, wherein performing the behavioural analysis comprises:
   determining an entity associated with the intercepted activity;
   determining an entity threat value for the entity, the entity threat value being indicative of a level of threat that the entity represents to the processing system, wherein the entity threat value is determined based on one or more characteristics of the entity; and
   comparing the entity threat value to an entity threat threshold to identify if the entity is malicious.

9. The method according to claim 8, wherein each of the one or more characteristics of the entity is associated with a respective characteristic threat value, wherein the method comprises calculating the entity threat value using at least some of the characteristic threat values for the one or more characteristics of the entity.

10. The method according to claim 9, wherein at least one of the one or more characteristics of the entity is associated with a characteristic threat value formula, wherein the method comprises calculating, using the characteristic threat value formula, the characteristic threat value.

11. A system to detect if a processing system has been compromised with audio/visual threat, the system comprising:
   a processor;
   memory in electronic communication with the processor;
   an interception module configured to:
      identify a requesting entity and a target entity, wherein the requesting entity originates one or more requests to perform an activity in relation to the target entity, and wherein the target entity comprises an audio and/or visual communication device of the processing system;
      intercept the one or more requests in the processing system to perform the activity associated with the audio and/or visual communication device of the processing system;
      record the intercepted one or more requests and properties associated with the requesting entity and the target entity in an intercepted request log file; and
   an analysis module configured to:
      perform a behavioural analysis of a trend in the processing system using the intercepted request log file to determine if the processing system exhibits behavioural characteristics indicative of the processing system having been compromised with an audio/visual threat.

12. The system according to claim 11, wherein the system is configured to:
   determine, using the request to perform the activity, an entity associated with the activity; and
   perform the behavioural analysis in relation to the entity.

13. The system according to claim 12, wherein the system is configured to apply one or more behavioural rules to perform the behavioural analysis.

14. The system according to claim 13, wherein application of the one or more behavioural rules determines at least one of:
   if the entity is indicative of at least one of audio signal and visual signals being obtained by the audio and/or visual communication device;

if the entity is being interacted via a graphical user interface currently displayed on the desktop of the processing system;

if the entity is recording data indicative of at least one of audio data and visual data;

if the entity was launched by the user;

if the entity is attempting to connect to a remote network; and if the entity is requesting the activity to be performed at regular intervals;

wherein results of the application of the one or more behavioural rules is used to determine whether the processing system having been compromised with an audio/visual threat.

15. The system according to claim 11, wherein a requesting entity requests the activity to be performed in relation to a target entity, wherein the system is configured to:

determine, using a filter module, if the activity is suspicious or non-suspicious; and analyse, using an analysis module, at least one of the activity, the requesting entity and the target entity in response to determining that the activity is suspicious.

16. The system according to claim 15, wherein the filter module filters the activity according to the requesting entity and the target entity to determine if the activity is suspicious or non-suspicious.

17. The system according to claim 15, wherein the analysis module comprises a list of activity sequences indicative of an audio/visual threat, wherein the system is configured to analyse the suspicious activity by comparing the suspicious activity and at least one of activities which occurred prior to the suspicious activity and activities which occurred after the suspicious activity to the list of activity sequences, wherein in response to a positive comparison, the activity is determined to be associated with an audio/visual threat.

18. The system according to claim 11, wherein the system is configured to:

determine an entity associated with the intercepted activity;

determine an entity threat value for the entity, the entity threat value being indicative of a level of threat that the entity represents to the processing system, wherein the entity threat value is determined based on one or more characteristics of the entity; and compare the entity threat value to an entity threat threshold to identify if the entity is malicious.

19. The system according to claim 18, wherein each of the one or more characteristics of the entity is associated with a respective characteristic threat value, wherein the system is configured to calculate the entity threat value using at least some of the characteristic threat values for the one or more characteristics of the entity.

20. A computer program product comprising a non-transitory computer readable medium having a computer program recorded therein or thereon, the computer program being configured to detect if a processing system has been compromised with audio/visual threat, wherein the computer program product configures the client processing system to:

identify a requesting entity and a target entity, wherein the requesting entity originates one or more requests to perform an activity in relation to the target entity, and wherein the target entity comprises an audio and/or visual communication device of the processing system;

intercept the one or more requests in the processing system to perform the activity associated with the audio and/or visual communication device of the processing system;

record the intercepted one or more requests and properties associated with the requesting entity and the target entity in an intercepted request log file; and perform a behavioural analysis of a trend in the processing system using the intercepted request log file to determine if the processing system exhibits behavioural characteristics indicative of the processing system having been compromised with an audio/visual threat.

* * * * *